United States Patent [19]

Tremblay et al.

[11] 4,156,700
[45] May 29, 1979

[54] SOLID PROPELLANTS CONTAINING POLYETHER OR POLYESTER BINDERS

[75] Inventors: Meude Tremblay, Charlesbourg; Guy Perrault; Gonzague Duchesne, both of Ste-Foy, all of Canada

[73] Assignee: Her Majesty the Queen in right of Canada, as represented by the Minister of National Defence, Ottawa, Canada

[21] Appl. No.: 707,347

[22] Filed: Jul. 21, 1976

[30] Foreign Application Priority Data

Aug. 11, 1975 [CA] Canada .................................. 233243

[51] Int. Cl.² ............................................. C08L 63/00
[52] U.S. Cl. ................................ 260/837 R; 149/19.9; 149/19.91; 260/348.62; 260/348.12; 260/836; 526/15; 526/21; 526/22; 526/53; 526/54; 560/89; 560/93
[58] Field of Search ................ 260/836, 837 R, 78.41, 260/485; 149/19.91; 526/15, 21, 22, 54, 35

[56] References Cited

U.S. PATENT DOCUMENTS

| | | | |
|---|---|---|---|
| 3,427,255 | 2/1969 | Case ...................................... | 252/426 |
| 3,734,786 | 5/1973 | Walden et al. ...................... | 149/19.91 |
| 3,902,935 | 9/1975 | Wall ..................................... | 149/19.9 |
| 3,975,314 | 8/1976 | Smyk et al. ......................... | 260/2 EP |

*Primary Examiner*—Theodore E. Pertilla

*Attorney, Agent, or Firm*—Frishauf, Holtz, Goodman & Woodward

[57] ABSTRACT

Useful hydroxyl-terminated polyolefin prepolymers, e.g. polybutadiene prepolymers, are provided which may be cross-linked with an epoxide to yield a polyether elastomeric material or with a mixture of an anhydride and an epoxide to form a polyester material. One such prepolymer is a carboxyl-terminated polyolefin, e.g. polybutadiene prepared by reacting a hydroxy-terminated polyolefin, e.g. polybutadiene with solid or liquid anhydrides. Polyether and polyester propellants containing up to about 88% of solid ammonium perchlorate in the powder form and aluminum powder may be prepared from the above two materials (binders). The physical and mechanical properties from these propellants depend on the ratios and on the order of addition of each ingredient, the curing temperature and the presence of surface-active agents. Polyester propellants may be made either by using the hydroxy-terminated polyolefin, e.g. polybutadiene prereacted with anhydrides or by mixing simultaneously all ingredients with the solids. Polyester propellants made by the former procedure have superior properties to those made from the latter. Polyether propellants have slightly lower mechanical and physical properties than those of polyesters. These properties are strongly dependent on the catalytic activity of ammonium perchlorate.

12 Claims, 14 Drawing Figures

SOLID PROPELLANTS CONTAINING POLYETHER OR POLYESTER BINDERS

BACKGROUND OF THE INVENTION (i) Field of the Invention

This invention relates to novel carboxyl-terminated polyolefins, more especially polybutadiene, to novel binders comprising polyether or polyester elastomers derived from such carboxyl-terminated polyolefins, more especially such carboxyl-terminated polybutadienes, and to novel composite propellants containing such novel polyether and polyester elastomers. The present invention also includes the solid rocket propellants formed from such binders.

(ii) Description of the Prior Art

In the prior art, composite solid propellants having superior mechanical properties and good stability at high temperatures were obtained by cross-linking carboxyl-terminated polybutadiene with epoxides.

Thus, polybutadiene propellants have been provided which have, as a binder, an elastomer formed from a heretofore known carboxyl-terminated homo-, co-, or terpolymer of polybutadiene and a curing system which involves aziridines or epoxides either alone or in combination. This curing system with which carboxyl groups of the polybutadiene react to produce amide links when tris(2-methyl-1-aziridinyl)-phosphine oxide is the cross-linking agent or ester links when polyepoxides are the cross-linking agent, requires a curing time up to one week. In addition to the long period of cure which is necessary to obtain propellants of fair quality the aziridine has many drawbacks as it is toxic, has a tendency to degrade when subjected to prolonged heating, high relative humitity or hot conditions and it also tends to post cure, thus increasing the modulus of the binder and as such the propellants. It was found moreover, that, while the ester formed by the action of the epoxide group on the terminal carboxyl groups gave a binder having great stability, good mechanical properties at low temperatures, the elimination of the aziridines (which favored adhesion of the binder with particles of ammonium perchlorate) resulted in a propellant having a short life. It was then found that the addition of surface active agents to the polyester binders permitted the improvement of the mechanical properties at low temperatures of the propellants. Furthermore, while some of the drawbacks may be partially removed by the addition of the butylene imine derivative of trimesic acid, these imines are also unstable to heat and humidity, especially a butylene imine derivative of trimesic acid which decomposes at about 0° C. and further the imines are hazardous materials as they produce dermatitis on contact with the skin. Finally, the oxidizer ammonium perchlorate which is incorporated into the binder to form the rocket propellant may also react exothermically with aziridines leading to fires if the ammonium perchlorate is not properly wetted with other ingredients of the binder. These prepolymers are very viscous and thus do not permit incorporation of a percentage of solids more than about 85%.

Attempts have therefore been made to substitute the tris(2-methyl-1-aziridinyl) phosphine oxide epoxide curing system in the binders for the propellants. One such attempt has been the production of hydroxyl-terminated polybutadiene, by the living polymer synthesis followed by treatment thereof with ethylene oxide, alcohols or water. These hydroxyl-terminated polybutadiene were usually cured with isocyanates in the presence of different catalysts. However, some of these hydroxyl-terminated polybutadienes were found to exhibit a reactivity with isocyanate which was too high for propellant use, having, amongst other things, a short pot like for certain applications.

Another attempt to replace the tris(2-methyl-1-aziridinyl) phosphine oxide epoxide curing system involved the use of carboxyl-terminated polybutadiene such as, for example, that supplied under the Trade Mark HC 434 by Thiokol Chemical Corporation which had a high percentage of cis-structure (i.e. about 32%). This carboxyl-terminated polybutadiene was reduced with lithium hydride into hydroxyl-terminated polybutadiene for curing with isocyanates; the gelation time with 2,4-tolylene diisocyanate was, however, about 3 hours at about 80° F. which was considered to be much too short to be useful in the production of binders in propellant manufacture. This fast cure was attributed to the presence of primary terminal hydroxyl groups in the hydroxyl-terminated polybutadiene and moreover the purification process of the hydroxyl-terminated polybutadiene was difficult as it left about 0.15% residual solids which interfered in the curing reaction. The rapid cure of the hydroxyl-terminated polybutadiene with hexamethylene diisocyanate gave a gelation time of six hours at about 27° C., which was twice that obtained with 2,4-tolylene diisocyanate and which was not completely satisfactory. An improved hydroxyl-terminated polybutadiene was, however, obtained from the carboxyl-terminated polybutadiene in which the terminal hydroxyl groups are secondary hydroxyl groups.

Nevertheless, it has been found that such carboxyl-terminated polybutadienes (e.g. those prepared in the presence of free radical initiators and known by the Trade Marks of "HC 434" of Thiokol Chemical Corporation, "Syntitico" of Synthetico Rubber Company of Japan and "HYCAR-CT" of B. F. Goodrich Chemical Company) contained measurable quantities of peroxides and glutaric acid. These impurities have been found to impart poor oxygen stabllity to the polymers. On the other hand, such prepolymers prepared by ionic reactions (e.g. those known by the Trade Marks of "Telagen CT" of General Tire Rubber Co. and "Butarez CTL" of Phillips Petroleum Co.) did not have good stability. In addition such prepolymers in general had a high viscosity (i.e. about 250–450 poises, at about 25–45 Ns/m²).

Other carboxyl-terminated saturated prepolymers which have been proposed are those known by the Trade Marks of "UTREZ" of United Technology Center, "ZL-635" of Thiokol Chemical Corporation, and "Telagen SCT" of Genera Tire and Rubber Company. These, however, were found to be unsuitable, since they were very viscous. Furthermore, they did not provide products which possessed good mechanical properties at low temperatures.

Some binders have been obtained from commercially available carboxyl-terminated polybutadiene (HC 434) after cross-linking with epoxides. Examples of suitable epoxides are those known by the Trade Marks of "Epon 812" (derivative of triglycidyl glycerol) and "Epon 828" of Shell Company, of "DER 732" (diglycidyl ether of polyoxypropylene glycol) of the Dow Chemical Company, of "ERL 4221" (3,4 epoxycyclohexylmethyl 3', 4'-epoxy cyclohexane carboxylate) and "ERLA 0510" (N,N-diglycidyl-p-aminophenyl glycidyl ether) or Union Carbide Co. Many of the commercially available epoxides provided polyester binders which were only usable with difficulty to obtain propellants having high proportions of solids, because of the high viscosity of the prepolymers. When tris(2-methyl-1-aziridinyl) phosphine oxide is deleted from the formulation it is usually necessary to add surface active agents in order to improve the mechanical properties at low temperatures. In addition there is an increased curing time and a decreasing of the elongation during the course of the accelerated aging of the propellant.

As noted above, it has been proposed to cross-link the hydroxyl-terminated polybutadiene with isocyanates in order to obtain polyurethanes. Isocyanates which have usually been used in the binders for solid propellants are 2,4-toluene diisocyanate and the polymeric diisocyanate (DDl) made by General Mills Chemical Inc.

Examples of such polyurethane binders which were more frequently used commercially are those having, as prepolymer, the products known by the Trade Marks of "Telagen HT" of General Tire and Rubber Company, "Butarez HTS" of Phillips Petroleum Co. and "R45M" (hydroxyl-terminated polybutadiene) of ARCO Chemical Co. Because of its low cost and its low viscosity R45M was the product most frequently used. All the prepolymers gave polyurethane binders whose stability at high temperatures was probably less than that of polyester binders.

Another form of binder is that which is disclosed in Canadian Pat. No. 891,562 issued Jan. 25, 1972, namely an hydroxy telechelic polymer which is the reaction product of a carboxyl telechelic polymer and a mono epoxy compound.

The term "telechelic polymer" as set forth in U.S. Pat. No. 3,281,335 issued Oct. 25, 1966 to C. A. Wentz and F. E. Hopper as well as an article by the same authors entitled "Process for the Production and Purification of Carboxy Telechelic Polymers" defines polymers which are produced by polymerization of vinylidene containing monomers having reactive groups at each end of the polymer molecule. The above-identified patent provides hydroxy telechelic polybutadienes desirably rich in cis-isomer, obtained by the reaction of a mono-epoxy compound and the corresponding carboxy polymers. The term "hydroxyl-terminated" as used herein means having hydroxyl groups, including primary and secondary hydroxyl groups attached adjacent the ends of the polymer molecule and preferably at the ends of the molecule. The mono-epoxy compound may be any organic compound containing a single epoxy grouping including mono-epoxy resins; particularly preferred however are epoxy compounds of the formula:

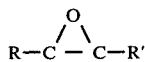

wherein each of R and R' is hydrogen, aryl, or an alkyl, preferably a lower alkyl group. Particularly there may be mentioned 1,2-alkylene oxides such as, for example, propylene oxide and 1,2-butylene oxide which produce secondary hydroxyl groups when reacted with the carboxyl telechelic polymer.

A typical molecule of the hydroxyl-terminated polybutadiene rich in cis-isomer according to the aforesaid patent prepared by the reaction of the large molar excess of propylene oxide with the carboxyl-terminated polybutadiene rich in cis-isomer supplied under the Trade Mark HC 434 which has a molecular weight of about 3,800 is believed to be as follows:

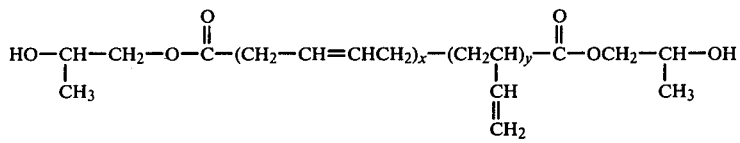

The above-identified patent also provided an elastomeric binder for use in forming a castable propellant comprising (a) a hydroxyl-telechelic polymer, particularly a hydroxyl-terminated polybutadiene rich in cis-isomer, which is the reaction product of a carboxyl telechelic polymer, particularly a carboxyl-terminated polybutadiene rich cis-isomer, and a mono-epoxide particularly a 1,2-alkylene oxide such as, for example, propylene oxide and 1,2-butylene oxide and (b) a tri-isocyanante or (c) a diisocyanate such as, for example, tolylene diisocyanate together with a triol cross-linking agent, with a tri-isocyanate cross-linking inherently occurring to form the binder. The above-identified patent also included a solid polybutadiene propellant comprising such elastomeric binder, finely divided ammonium or potassium perchlorate and finely divided aluminum.

However, presently available binders derived from hydroxyl-terminated polybutadiene and diisocyanate or carboxyl-terminated polybutadiene and epoxide-tris(2-methyl-1-aziridinyl) phosphine oxide curing agents suffer the disadvantage that they have weak stability with respect to oxidizing agents.

SUMMARY OF THE INVENTION

(i) Aims of the Invention

The present invention has for one object the production of polyether or polyester binders from hydroxyl-terminated polybutadiene, e.g. from an hydroxyl-terminated polybutadiene known by the Trade Mark of R45M.

Another object of the present invention is the utilization of the advantages of this hydroxyl-terminated polybutadiene as a prepolymer, two such advantages being its low viscosity and its very low cost.

Another object of this invention is the use of such prepolymer to eliminate the presence of the polyurethane or phosphine oxide groups which apparently are responsible for the instability of the binder.

(ii) Statements of Invention

By this invention, a process is provided for preparing a carboxyl-terminated polyolefin, more especially a carboxyl-terminated polybutadiene which comprises reacting an hydroxyl-terminated polyolefin, more especially an hydroxyl-terminated polybutadiene with solid or liquid acid anhydrides.

This invention also provides such an improved process wherein anhydrides are solids, e.g. succinic anhydride or methylsuccinic anhydride, or wherein the anhydrides are liquid, e.g. cis-1,2-cyclohexanedicarboxylic anhydride or 3-methylglutaric anhydride.

This invention also provides a process for preparing a modified carboxyl-terminated polyolefin, more especially a carboxyl-terminated polybutadiene which comprises: reacting an hydroxyl-terminated polyolefin, more especially an hydroxyl-terminated polybutadiene with solid or liquid acid anhydrides; and reacting the carboxyl derivatives so formed with epoxides in the presence of a metallic salt catalyst.

This invention also provides a process for preparing cross-linked elastomers broadly categorized as (A) the polyether reaction product of an hydroxyl-terminated polyolefin, more especially an hydroxyl-terminated polybutadiene and an epoxide or (B) the polyester reaction product of a carboxyl-terminated polyolefin, more especially a carboxyl-terminated polybutadiene and epoxide.

This invention also provides a propellant comprising (I) a cross-linked elastomer selected from (A) the polyether reaction product of an hydroxyl-terminated polyolefin, more especially an hydroxyl-terminated polybutadiene and an epoxide and (B) the polyester reaction product of a carboxyl-terminated polyolefin, more especially a carboxyl-terminated polybutadiene and an epoxide; (II) ammonium perchlorate powder; and (III) aluminum powder.

(iii) Other Features of the Invention

While the preferred polyolefin used in this invention is polybutadiene, other polyolefins would be useful as well. Other dienes, such as, for example, pentadiene, heptadiene, isoprene, etc., having hydroxyl end groups which are liquid at room temperature would be operative.

Polyolefins having hydroxyl end groups, such as, for example, polyethylene, polybutylene or polypropylene yield saturated binders with a slightly higher glass transition temperature, and are also operative within the scope of this invention.

Polyoxypropylene glycol, polyoxybutylene glycol or other polyoxyalkylene glycols could also be used, but would yield elastomers or propellents with higher glass transition temperatures.

Among the suitable solid and liquid anhydrides operative within the scope of this invention are the following: most solid anhydrides from aromatic or alicycle dicarboxylic acids that are soluble in common solvents, i.e. succinic anhydride, methylsuccinic anhydride, benzenedicarboxylic anhydride, phathalic anhydride, cyclobutanedicarboxylic anhydride, 3-methylglutaric anhydride, hexahydro-4-methylphthalic anhydride, etc. Moreover, some useful anhydrides are only sparingly soluble in common solvents. All dianhydrides are excluded and will give rise to cured gumstocks.

The anhydrides that are liquid at the curing temperature (about 60° C.) and, relatively, not too expensive, are very limited: 3-methylglutaric anhydride and 1,2 cis-cyclohexanedicarboxylic anhydride are the only ones found available commercially heretofore.

Among the solvents that may be used in this invention are those solvents that have a boiling range of about 60°–110° C., are inexpensive and inert towards hydroxyl-terminated polybutadiene or the anhydride, including, in addition to benzene or toluene, methyl and ethyl acetate, dioxane, hexane, cyclohexane, etc.

Suitable metallic salts useful as catalysts include various salts of iron, tin or chromium. The chromium salts were found to be more active for the epoxide-hydroxyl or epoxide/carboxyl reaction. Suitable salts include: the iron salts (linoleate, octasol, naphthenate), the tin salts (stannous octoate) and the chromium salts (diisopropyl salicylate [DIPS], naphthenate, stearate and acetylacetonate). In addition, the following are also useful epoxy cure catalysts: chromium acetate, cupric acetyl acetonate, thorium acetyl acetonate, vanadium acetyl acetonate, calcium acetyl acetonate, zirconium acetyl acetonate, sodium acetyl acetonate, titanium acetyl acetonate, and iron hexafluoro acetyl acetonate.

With respect to polyethers, the present invention provides for cross-linking an hydroxyl-terminated polyolefin, more especially an hydroxyl-terminated polybutadiene with epoxides. It has been found that the formation of polyethers is much slower than the formation of polyesters, and moreover that it requires a longer curing time. Moroever the use of chromium salts above as catalysts does not yield the elastomer even at a relatively elevated temperature. In the presence of both ammonium perchlorate and chromium salts, however, the curing of an hydroxyl-terminated polyolefin, more especially an hydroxyl-terminated polybutadiene with epoxides forms a polyether product at a temperature of about 60° C. where the ammonium perchlorate acts as an initiator and the diol reacts with the di-epoxide to give a polyether.

Additional epoxides which are suitable for use in the present invention are tabulated below:

TABLE 1

| ANALYSIS OF COMMERCIAL EPOXIDES | | | | | |
|---|---|---|---|---|---|
| NAME | SUPPLIER | MOLECULAR WEIGHT | Ephr | EQUIV. WEIGHT | f |
| Epon 801 | Shell Chemical | 168 | | | |
| Epon 812 | " | 363 | 0,653 | 153 | 2,37 |
| " | " | 364 | | | |
| " | " | 352 | | | |
| 815 | " | 317 | 6,4971 | 201,1 | 1,57 |
| 820 | " | 324 | | | |
| 826 | " | 345 | | | |
| 828 | " | 365 | | | |
| 828 | " | 385 | | | |
| " | " | 396 | | | |
| 830 | " | 407 | | | |
| 871 | " | 734 | | | |
| 872 | " | 1 160 | | | |
| ERL 2774 | Faymor Chemical | 400 | 0,5082 | 196,7 | 2,03 |
| 3794 | " | 385 | 0,5251 | 190,4 | 2,02 |
| 4206 | " | 155 | 1,51 | 66,2 | 2,34 |
| 4221 | Bakelite | 295 | | | |
| 4221 | Faymor Chemical | 271 | 0.759 | 132 | 2,05 |

TABLE 1-continued
ANALYSIS OF COMMERCIAL EPOXIDES

| NAME | SUPPLIER | MOLECULAR WEIGHT | Ephr | EQUIV. WEIGHT | f |
|---|---|---|---|---|---|
| EP 201 | Bakelite | 226 | | | |
| ERL 4289 | " | 427 | 0,5220 | 192 | 2,22 |
| " | Faymor Chemical | 416 | | | |
| EPOTUF 27-140 | Reichold Chemicals | 369 | | | |
| EPOTUF 37-151 | " | 892 | 0,282 | 354,6 | 2,52 |
| Araldite 6010 | Ciba Co. Ltd. | 414 | 0,4966 | 201,3 | 2,05 |
| Araldite 538 | " | | | | |
| Araldite RD2 | " | 241 | 0,872 | 114,6 | 2,10 |
| Araldite RD4 | " | 142 | 1,264 | 79,0 | 1,79 |
| Araldite CY-178 | " | 419 | 0,5496 | 181,9 | 2,30 |
| Araldite CY-179 | " | 265 | 0,6913 | 144,6 | 1,83 |
| D.E.R. 331 | Dow Chemical | 375 | 0,526 | 190 | 1,97 |
| D.E.R. 732 | " | 576 | 0,322 | 310 | 1,86 |
| D.E.R. 736 | " | 340 | 0,562 | 178 | 1,91 |
| D.E.N. 431 | " | 479 | 0,571 | 175 | 2,74 |
| D.E.R. 337 | " | 598 | 0,417 | 240 | 2,49 |
| D.E.R. 334 | " | 335 | 0,555 | 180 | 1,86 |
| D.E.R. 332LC | " | 377 | 0,588 | 170 | 2,21 |

Ephr = equivalent per hundred gram of resin
f = functional group per molecule

Epon 801 : Phenyl glycidyl ether
Epon 812
815
820
826
828 } G1—OCH$_2$CH(OG1)CH$_2$OG1 (where G1 = glycidyl)
830 } G10—C$_6$H$_4$—C(CH$_3$)$_2$—C$_6$H$_4$—O G1
871 : diglycidyl of dimer acid
872 : dimer acid diglycidyl ether of bis-phenol A
ERL 2774
3794 } G10—C$_6$H$_4$—C(CH$_3$)$_2$C$_6$H$_4$—OG1
4206 : vinylcyclohexanone dioxide
4221
4221 } 3,4-epoxycyclohexylmethyl-3',4'-epoxycyclohexane carboxylate
EP 201
ERL 4289 : Bis(3,4-epoxy-6-methylcyclohexylmethyl)adipate
EPOTUF 27—140 : G10—C$_6$H$_4$—C(CH$_3$)$_2$—C$_6$H$_4$—OG1
EPOTUF 37—151 : dibasic acid-diglycidyl ether of bis-phenol A
Araldite 6010 : Similar to Epon 828
Araldite 538 : O-cresol formaldehyde novolacpolyglycidyl derivative
Araldite RD2 : diglycidyl-4-butane diol
Araldite RD4 : diglycidyl-resorcinol
Araldite CY-179 : cycloaliphatic epoxide
D.E.R. 331 : similar to EPON 828
D.E.R. 732
D.E.R. 736 } diglycidyl ether of polypropyleneglycol
D.E.N. 431 : epoxy novalac
D.E.R. 337
D.E.R. 334 } diglycidyl ether of bis-phenol A
D.E.R. 332LC The above-identified reaction may be represented as follows:

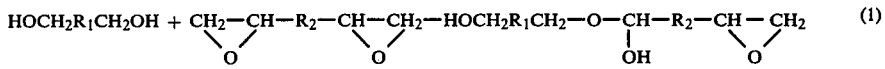

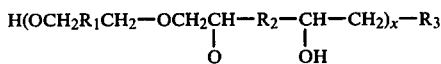

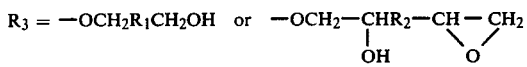

(1)

This reaction resulting in the formation of polyethers is usually favored by the presence of amines, carboxylic acids, water, etc. at slightly higher temperature. In this case, ammonium perchlorate acts as a catalyst at a lower temperature (i.e. at about 60° C.). At higher temperatures (e.g. about 100°-110° C.) ammonium perchlorate would initiate and favor the formation of glassy polyepoxides. At a lower temperature formation by polyetherification is favored, as indicated by the determination of the glass transition point of the polyether propellant (i.e. about —78° C.), as measured by Differential Scanning Calorimetry.

The present invention also contemplates the formation of polyester propellant binders by cross-linking carboxyl-terminated polybutadiene with epoxides. This very slow reaction is accelerated by the use of catalysts, e.g. chromium or other metal salts. The hydroxyl-terminated polybutadiene is first transformed into a carboxyl-terminated polybutadiene by a known procedure. This derivative is then cross-linked with epoxides in the presence of, preferably, chromium salts, to form an elastomer (a polyester).

The invention also contemplates the formation of polyester binders by means of a cross-linking reaction between hydroxyl-terminated polybutadiene and a mixture of anhydrides and epoxides. It was found that it was not possible to form a rubbery elastomer by the reaction of hydroxyl-terminated polybutadiene with expoxides in the absence of ammonium perchlorate, even in the presence of chromium salts at temperatures varying from about 60° C. to about 125° C. However, the addition of certain anhydrides, e.g. those anhydrides of 3-methylglutaric acid and cis-1,2-cyclohexanedicarboxylic acid produced a binder at about 80° C. These anhydrides which are liquid at the reaction temperature and which are soluble in the prepolymer, enter into the reaction with the hydroxyl groups of the polybutadiene to form a diacid, which then reacts with the diepoxide to give a polyester according to the following reaction:

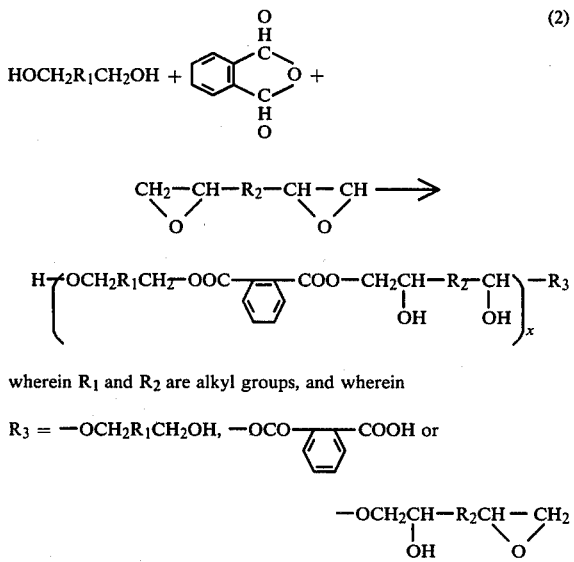

wherein $R_1$ and $R_2$ are alkyl groups, and wherein $R_3 = $ —$OCH_2R_1CH_2OH$, —OCO———COOH or

—$OCH_2CH$—$R_2CH$—$CH_2$
 |  \ /
 OH   O

The above-described reaction of certain anhydrides, in particular the reaction product of cis-1,2-cyclohexanedicarboxylic anhydride and hydroxyl-terminated polybutadiene is cured with the epoxide; this results in the formation of an elastomer or a propellant at a temperature lower than that at which the ingredients and mixed in a single step.

Thus the present invention also contemplates the production of polyether and polyester binders cross-linked with epoxides and is a radical departure from the prior art. In the past, the hydroxyl-terminated polybutadiene was cross-linked with isocyanates to give a polyurethane binder used in propellants and explosive compositions. The low viscosity of the hydroxyl-terminated polybutadiene used, its great commercial availability and its low cost make hydroxyl-terminated polybutadiene a preferred reactant. The present invention also takes advantage of the marked advantages of this product, particularly its low viscosity, to permit the incorporation of a large proportion of solids in the propellants. The use of the novel curing system using hydroxyl-terminated polybutadienes as one of the reactants in the process of this invention gives a polyether or polyester binder which is more heat-stable than the conventional binders.

BRIEF DESCRIPTION OF THE DRAWINGS

In the accompanying drawings.

DESCRIPTION OF PREFERRED EMBODIMENTS

The following are examples of embodiments of this invention.

EXAMPLE I

Preparation of the succinic anhydride derivative of hydroxyl-terminated polybutadiene.

(a) A mixture of hydroxyl-terminated polybutadiene (that known by the Trade Mark of R45M by Arco Chemical Co.) in an amount of 1420 g (1.00 eq.), succinic anhydride in an amount of 100 g (1.0 mole) and benzene in an amount of 1500 cc are heated under reflux conditions for 48 hours. After evaporation of the solvent, 1510 g of a product is obtained having an equivalent weight of 1490 from its carboxyl content and a viscosity of 180 poises (18Ns/m$^2$) at 25° C.

(b) The same reactants are boiled in toluene for 24 hours to give a product having an equivalent weight of 1500 and a viscosity of 156 poises (15.6Ns/m$^2$) at 25° C.

EXAMPLE II

Preparation of the methyl succinic anhydride derivative of hydroxyl-terminated polybutadiene.

The same condensation as described above in Example I was carried out using methyl succinic anhydride instead of succinic anhydride, to provide a product having an equivalent weight of 1534 and viscosity of 185 poises (18.5Ns/m$^2$) at 25° C.

EXAMPLE III

Preparation of the cis-1,2-cyclohexanedicarboxylic anhydride derivative of hydroxyl-terminated polybutadiene.

Figure 1:
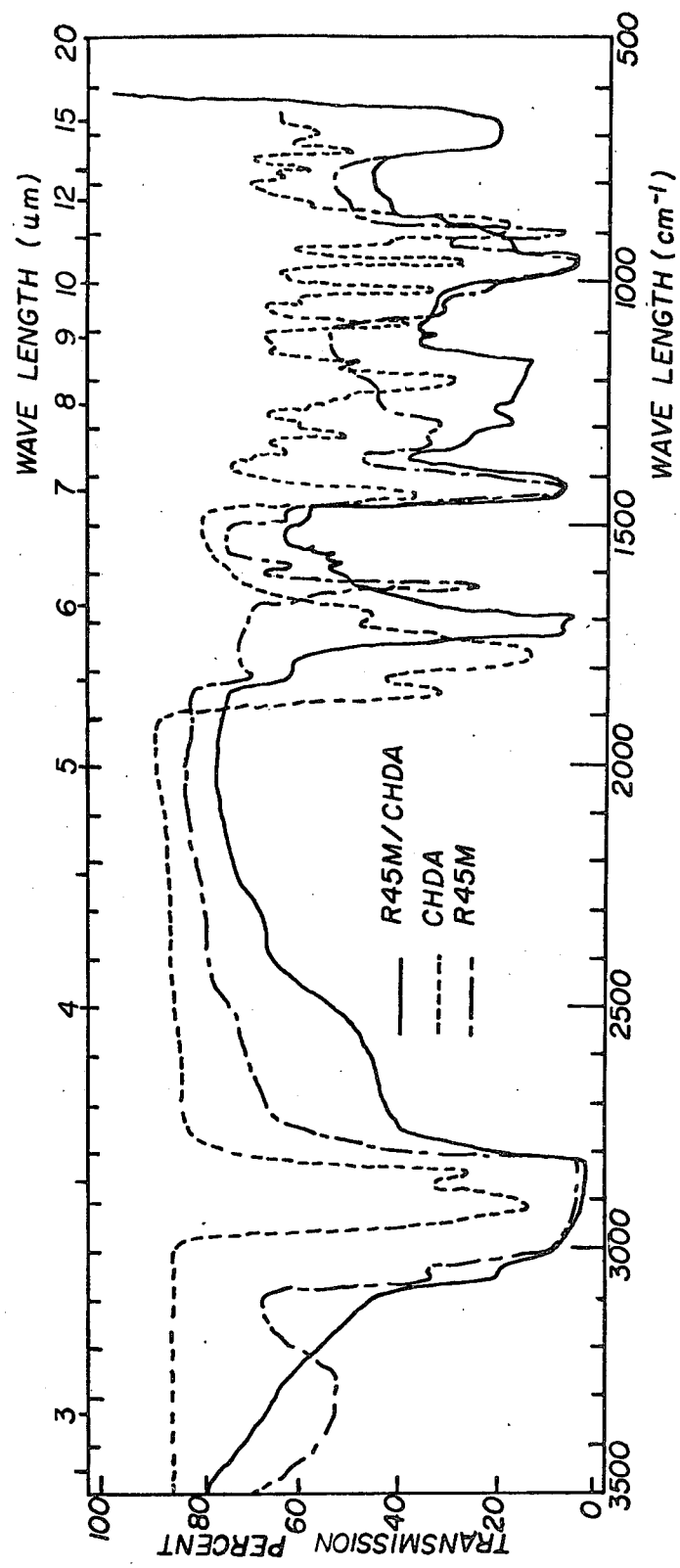
FIG. 1 is an infra red spectra graph with wave length as abscissa and percent transmission as ordinate.

A mixture of cis-1,2-cyclohexadicarboxylic anhydride in an amount of 154 g (1 eq.), and hydroxyl-terminated polybutadiene (that known by the Trade Mark of R45M by Arco Chemical Co.) in an amount of 1420 g (1 eq.) is heated at 90° C. for 66 hours. The infrared spectrum of the product which was obtained indicated the disappearance of the hydroxyl and anhydride groups of the mixture and the appearance of carboxyl groups. This is clearly seen in FIG. 1 of the drawings. The product had an equivalent weight of 1560 and a viscosity of 374 poises (37.4Ns/m$^2$) at 25° C. High viscosity is obtained if the reaction product of hydroxyl-terminated polybutadiene and cis-1,2-cyclohexanedicarboxylic anhydride is prepared in benzene. The results of Examples I, II and III are summarized below in Table II.

TABLE II

Properties of hydroxyl-terminated polybutadiene and carboxyl-terminated polybutadiene

| Name | Solvent | $M_n$ VPO | $M_n$ GPC | $M_w$ GPC | $\eta$ N.s/m$^2$ | Equiv. weight g |
|---|---|---|---|---|---|---|
| R45M (Lot 006181) | — | 4860 | 3330 | 4630 | 6.9 | 1420 |
| R45M/SA | Benzene | 5080 | 4290 | 6090 | 16.7 | 1500 |
| R45M/SA | Toluene | 8480 | 4600 | 6450 | 15.7 | 1500 |
| R45M/SA | Benzene | | 4775 | 6890 | 18.2 | 1490 |
| R45M/MSA | Benzene | | 5250 | 7290 | 18.5 | 1535 |
| R45M/MSA | Toluene | | 4640 | 6640 | 18.4 | 1440 |
| R45M/CHDA | | 2582 | 4240 | 6270 | 37.4 | 1420 |
| R45M/CHDA | Benzene | 3330 | | | 41.7 | 1350 |

R45M - Trade mark of hydroxyl-terminated polybutadiene
SA - Succinic Anhydride
MSA - Methylsuccinic Anhydride
CHDA - cis 1,2-cyclohexanedicarboxylic anhydride
VPO - Vapour Phase Osmometry
GPC - Gel Permeation Chromatography
$M_w$ - Weight Average Molecular Weight
$M_n$ - Number Average Molecular Weight
$\eta$ - Viscosity in Newton x seconde/meter$^2$, N.s/m$^2$

EXAMPLE IV

Preparation of polyester binders from succinic anhydride derivative of hydroxyl-terminated polybutadiene and epoxides (reaction product of hydroxyl-terminated polybutadiene and succinic anhydride).

In the following manner polybutadiene having terminal carboxyl groups (reaction product of hydroxyl-terminated polybutadiene and succinic anhydride) was cross-linked successively with various epoxides in the presence of chromium oleate as a catalyst. The mixture was placed in an oven at 60° C. until it had a constant hardness. The mechanical properties of the binders were measured in the following manner: The measurement of strain, elongation and Youngs Modulus were determined at an ambient temperature (22.8° C.) using an Istron (the Trade Mark of Instron Canada Ltd., Model TTC III 4) on rings made with the aid of a punch. The rings had an internal diameter of 3.170 cm, external diameter of 3.797 cm and an average thickness of 0.30 cm. The samples were stretched at a speed of 0.2116 cm/s. The effective length of the test sample was 3.505 cm.

EXAMPLE V

Preparation of polyester binders from hydroxyl-terminated polybutadiene, epoxides, and cis-1,2-cyclohexanedicarboxylic anhydride.

A mixture of an hydroxyl-terminated polybutadiene (that known by the Trade Mark of Arco Chemical Corp.), an epoxide and the cis-1,2-cyclohexanedicarboxylic anhydride, were poured into a Teflon (Trade Mark of a polytetrafluoroethylene) mold at 80° C. until it had the constant hardness of rubber. After a curing time varying between 7 and 18 days, the mechanical properties were determined according to the method above described.

Preparation of Castable Propellants

To form the castable propellant of the present invention, the above binder, before curing thereof, is suitably admixed with the finely divided ammonium perchlorate as oxidizer, preferably a mixture of ammonium perchlorate of particle size about 400, about 200 and about 17 $\mu$m in respective weight weight ratio of about 1.7, about 2.7 and about 1.0 and finely divided aluminum as fuel, preferably of the spherical type having a particle size of about 17 microns (aluminum in the powder form of about 17 $\mu$m average diameter size by Alcan). For high temperature applications, the ammonium perchlorate may be substituted by potassium chlorate. The propellants so obtained were made with a loading of about 88% solids. To facilitate mixing of the binder with the solids to produce the solid propellant with such a solid load of about 88%, the binder desirably includes a plasticizer such as, for example, isodecyl pelargonate, suitably in an amount of from about 20 to about 25%, which lowers the viscosity of the paste formed. A high percentage by weight of the plasticizer usually lowers the tensile strength of the propellant.

Thus, to prepare the castable propellant according to the present invention, the binder is, in some instances, prepared by mixing the novel polyester or polyether with a surface active agent and the mixture is stirred with a 500 g mixer (Atlantic Research Corp.) into a homogeneous paste. The solids, i.e. the finely divided ammonium perchlorate and finely divided aluminum are carefully blended, preferably in an optimum weight ratio of ammonium perchlorate/aluminum/binder of about 70/18/12 percent by weight respectively for good mixing of high solid loading. The binder mixture was added to the blend of the solid and stirred under vacuum in one pound mixer (Atlantic Research Corp.). With a solid load of about 88%, mixing had to be made in the blender at the curing temperature (about 60° C.) to increase fluidity. When mixing is over, the propellant mix may be poured into Teflon trays (Teflon is the trade mark for a polytetrafluoroethylene) and cured at about 60° C. to constant shore hardness. The physical properties of the binder and propellant are similar to those of the known tris(2-methyl-1-aziridinyl) phosphine oxide-epoxide system and the mechanical properties of the binder system can be much improved especially at low temperature by incorporating a small amount of a wetting agent to increase the bonding between the particle solids and the elastomeric binder. Such a wetting agent is a polymer made from N-methyldiethanolamine and an equivalent excess of sebacic acid containing carboxyl end groups of the following structure: H(COOCH$_2$CH$_2$—N(CH$_3$)—CH$_2$CH$_2$—COO(CH$_2$)$_8$)$_n$COOH and added suitably in an amount from about 0.3 to about 0.8 percent by weight, which wetting agent is found to be thoroughly compatible with the binder.

The final properties to be obtained in a solid propellant are dependent on the end use of the propellant as exemplified in Ind. Eng. Chem. Vol. 52, pp. 776–780, 1960. Some applications require high elongation (over about 40%) and strength at maximum stress (over about 0.55 MPa[80 psi] at room temperature).

To assess the properties of the propellant, the mechanical properties of the elastomeric binder according to a preferred embodiment of the present invention were assessed and in particular the conditions of formation of the binder, i.e. the properties of the ingredients; the curing temperature, the time of curing, the concentration of plasticizer and the catalyst level.

EXAMPLE VI

Preparations of samples of propellants.

Samples of propellants were prepared with ammonium perchlorate (a mixture of particle sizes of 400, 200 and 17 μm in the proportions of 1.7, 2.7, and 1.0 parts by weight respectively), alluminum (aluminum in powder form of 17 μm average diameter size sold by Alcan), and various other ingredients used in binders, according to the procedure hereinabove described. The various ingredients are mixed in amounts of 500 g in a mixer having vertical helices (Atlantic Research Corp., Alexandria, Virginia). To the mixtures of prepolymer and the plasticizer generally containing a surface active agent, aluminum, ammonium perchlorate and finally the cooking agent were added during the course of a period of 3 hours, while mixing constantly at a temperature of 60° C. under vacuum. The charge is cooled in a Teflon mold which is also agitated by a vibrator under vacuum. The cooking takes place at a constant temperature in an oven until the hardness of the sample was constant. Test samples of the propellant are then machined according to the JANAF dimensions (i.e. 1.270±0.050 cm thick, ends 2.540±0.010 cm wide and 2.54±0.05 long with a reduced body 0.952±0.010 cm wide and 7.493±0.010 cm long and having the form of a dogbone and the mechanical properties in traction were determined according to the usual methods. Out of the same blocks of propellants tongues 6.0 cm long by 0.5 cm thickness were cut. These serve as a means to measure the dynamic mechanical properties with the apparatus known as Rheovibron Dynamic Viscoelastomer, Model DDV II (Toyo Measuring Instrument Co., Tokyo, Japan). The range of temperatures studied were from $-100°$ C. to 0° C. The samples were refrigerated at a rate of 1° C. to 2° C. per minute. Sinusoidal oscillation of 110 cps (H) were applied to the tongues of the propellants.

The mechanical properties under traction were measured in the following manner. Test samples according to the dimensions specified by JANAF were machined from blocks of propellants. These served to enable the determination of the mechanical properties at 22.8° C. and $-45.5°$ C. while travelling on a moving apron at a speed of 0.0847 cm/s and at a rate of deformation of $0.0123 s^{-1}$. The effective length of the test samples was measured at 8.43 cm. The maximum change and the elongation obtained this way was determined by the curve of tension-extension which enables the calculation of the strain ($\sigma_m$) (stress at maximum load, MPa) to maximum elongation ($\epsilon_m$) (elongation at maximum load, cm/cm). The initial modulus is calculated by the slope at the beginning of the same curve (E, MPa).

EXAMPLE VII

Polymerization speed of binders obtained by measuring viscosity against temperature and catalysts.

The viscosity measurements are made by means of a ROTOVISKO unit (the Trade Mark of viscosity measuring apparatus of Gebruder Haake, Berlin).

Figure 2:
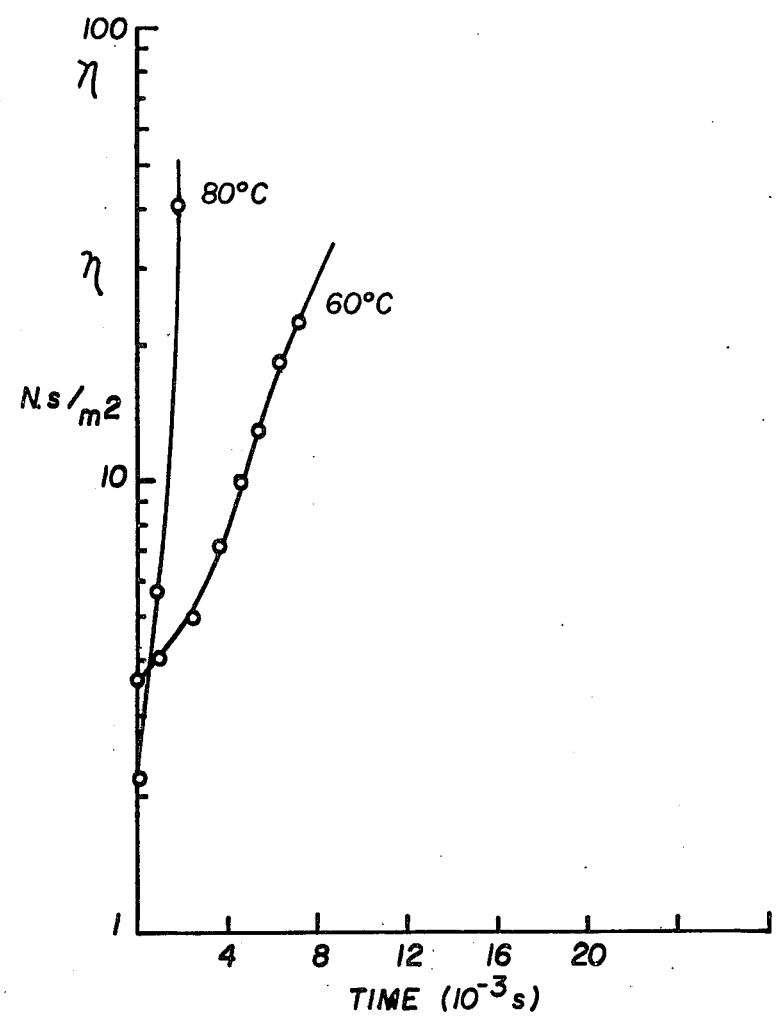
FIG. 2 is a graph of viscosity as ordinate against time in seconds as abscissa.
Figure 3:
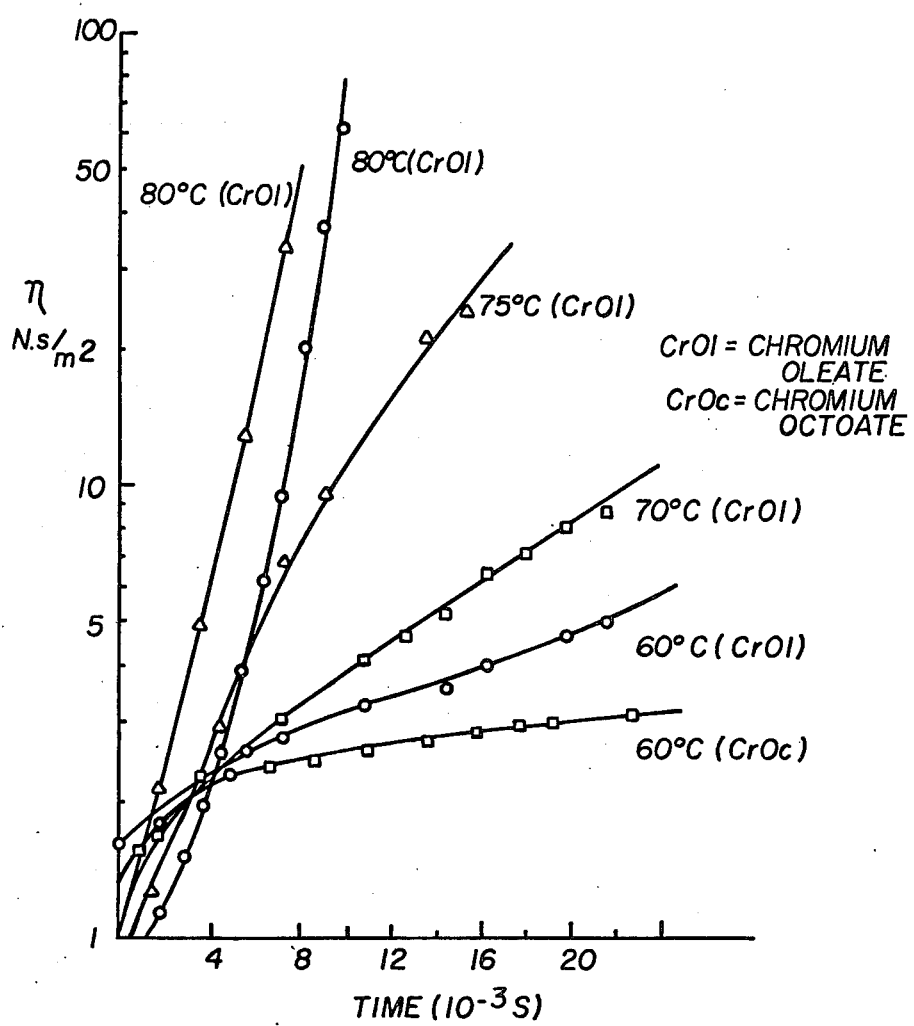
FIG. 3 is a graph of viscosity as ordinate against time in seconds as abscissa.

The increase in the viscosity of polyester binders (reaction product of hydroxyl-terminated polybutadiene and sebacic acid with epoxides or hydroxyl-terminated polybutadiene with anhydrides and epoxides) as a function of the reaction time was measured in the presence of different catalysts, at constant temperatures. It was noted that the initial viscosity of the reaction product of hydroxyl-terminated polybutadiene and succinic anhydride cured with epoxide is greater than that of the hydroxyl-terminated polybutadiene-anhydride-epoxide mixture at the same temperature, i.e. 3.6 and 1.6 N s/m$^2$, respectively at 60° C. The viscosity of the binder made from the reaction product of hydroxyl-terminated polybutadiene and succinic anhydride increases more quickly than that of the binder made from the reaction product of hydroxyl-terminated polybutadiene, cis-1,2-cyclohexanedicarboxylic anhydride and epoxide mixture, i.e. 27 and 2.9 Ns/m$^2$, respectively, after $8 \times 10^3$ seconds at 60° C. This is clearly shown in FIGS. 2 and 3.

Figure 4:
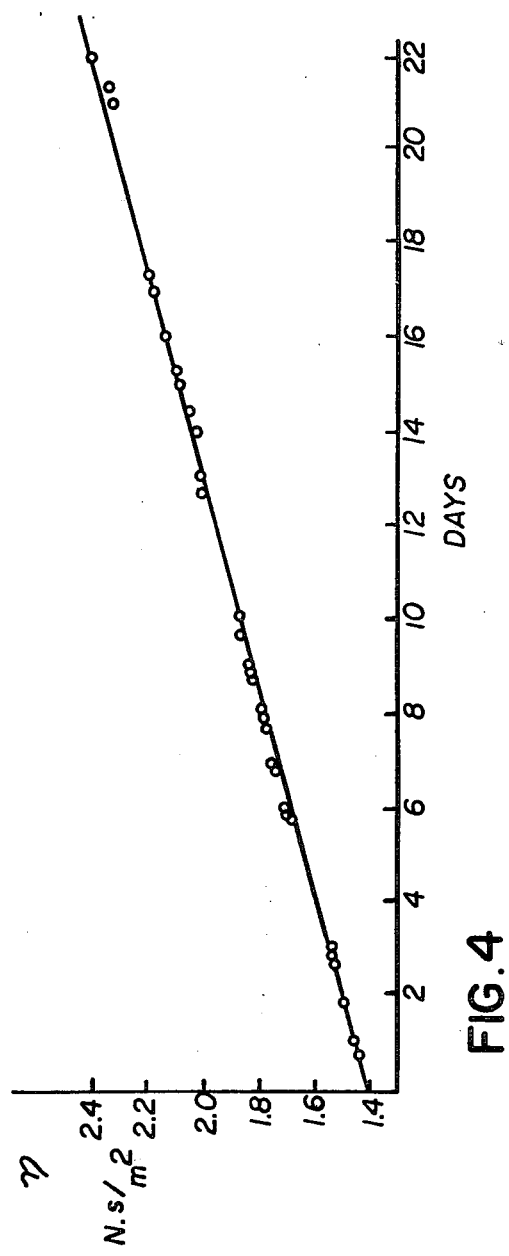
FIG. 4 is a graph of viscosity as ordinate against time in days as abscissa.

The increase in the viscosity of the polyether binders was determined at 60° C. as a function of time. The viscosity of the hydroxyl-terminated polybutadiene/P-BNA/epoxide similar to 3,4 epoxycyclohexylmethyl 3',4'-epoxycyclohexane carboxylate/chromium oleate mixture increases very slowly to 2.4 Ns/m$^2$ after $1.9 \times 10^6$ seconds (22 days). There is no gel formation after 70 days of reaction (see FIG. 4).

EXAMPLE VIII

Rate of polymerization of binders obtained by measuring the molecular weight by gel permeation chromatography.

The determination of molecular weights by gel permeation of the different binder mixtures has made it possible to measure the increase in the molecular weight of the product obtained in the reaction time.

The molecular weights $M_w$ and $M_n$ were determined by means of the ANA-PREP chromatograph of Waters Associates Inc. at 22.8° C. using tetrahydrofuran as a solvent. The four columns contained gels of porosity $7.0 \times 10^5$–$5 \times 10^4$, $1.5 \times 10^4$–$5 \times 10^4$, 700–2000 and 80–100 A, respectively. The molecular weights were calculated from the log M curve with counts obtained by using standard polystyrenes, corrected for the hydroxyl-terminated polybutadiene or carboxyl-terminated polybutadiene (Adams, H.E. and others, "A Cooperative Molecular Weight Distribution Test," J. of Appl. Polym. Sci. 17: pp. 269–282, 1973).

The low increase in viscosity of the polyether binders and the absence of gel formation encouraged the study of the increase in molecular weight as a function of time by GPC. The molecular weight of the hydroxyl-terminated polybutadiene/2,2' methylene bis(4-methyl-6-tertbutyl)phenol/epoxide similar to 3,4 epoxycyclohexylmethyl 3',4'-epoxy cyclohexane carboxylate/chromium oleate mixture increases slowly with time at 60° C.

This is summarized below in Table III.

TABLE III

Gel Permeation Chromatography Molecular Weights of hydroxyl-terminated polybutadiene and hydroxyl-terminated polybutadiene mixtures with time at 60° C. in a Stream of Air and Oxygen

| Mixtures | Time at 60° C. Days | $M_w$ | $M_n$ | $M_w/M_n$ | Observations |
|---|---|---|---|---|---|
| R45M/Air | 0 | 6,680 | 3630 | 1.84 | |
| R45M/Air | 6 | 77,600 | 4750 | 16.35 | Gel after 8 days |
| R45M/2% PBNA/$O_2$ | 30 | 6,300 | 3680 | 1.72 | Stable |
| R45M/0.01% PBNA/$O_2$ | 4 | 43,700 | 4730 | 9.25 | Gel after 7 days |
| R45M/2% A02246/$O_2$ | 27 | 7,813 | 3870 | 2.02 | Stable |
| R45M/CrOl/$O_2$ | 0 | 7,703 | 3870 | 1.98 | |
| R45M/CrOl/$O_2$ | 2 | 32,760 | 4520 | 7.24 | Gel after 3 days |
| R45M/CY179/$O_2$ | 1.0 | 22,150 | 4560 | 4.85 | Gel after 2 days |
| R45M/AP/$O_2$ | 1.0 | 134,800 | 5560 | 24.2 | Gel after 2 days |
| R45M/CrOl/CY179/$O_2$ | 1.0 | 25,500 | 4760 | 5.37 | Gel after 2 days |

R45M: Trade Mark for hydroxyl-terminated polybutadiene
PBNA:
A02246: Trade Mark for 2,2' methylene bis(4-methyl-6-tert-butyl) phenol
CrOL: Trade Mark for chromium oleate
CY179: Trade Mark for epoxide similar to 3,4 epoxycyclohexylmethyl 3'-4'-epoxycyclohexane carboxylate
AP: Tade Mark for ammonium perchlorate The gel time is shorter and polymerization is quicker in the presence of ammonium perchlorate. The increase in molecular weight of the hydroxyl-terminated polybutadiene by gel permeation chromatography was then determined to assess the effect of ammonium perchlorate, on the polymerization as a function of time at 60° C.

Firstly, to show the possible effect of atmospheric oxygen on hydroxyl-terminated polybutadiene, pure oxygen was circulated in the hydroxyl-terminated polybutadiene or mixtures containing hydroxyl-terminated polybutadiene. It is seen in Table III above that there is a rapid increase in the molecular weight, $M_w$, with the heating time at 60° C., and a rapid gel formation in the absence of sufficient quantities of anti-oxidant.

When, however, nitrogen was circulated, it was observed that the behaviour of hydroxyl-terminated polybutadiene varies at 60° C. depending on the compound accompanying the polybutadiene. The hydroxyl-terminated polybutadiene/PBNA mixture is stable at 60° C., but hydroxyl-terminated polybutadiene without an anti-oxidant polymerizes slowly and forms a gel after 90 days of reaction. The hydroxyl-terminated polybutadiene/ammonium perchlorate mixture polymerizes quickly and forms a gel after 10 days at 60° C. (see Table III, below, and FIG. 5).

TABLE IV

Gel Permeation Chromatography Molecular Weights of hydroxyl-terminated polybutadiene/ammonium perchlorate Mixtures at 60° C. under Nitrogen with Time Hydroxyl-terminated polybutadiene: 90.6 g; ammonium perchlorate, 200 μm; ammonium perchlorate, 10 μm in 5 to 3 respective weight ratio: 50g; temp: 60° C.

| Time Hr | $M_w$ | $M_n$ | $M_w/M_n$ |
|---|---|---|---|
| 0 | 6,680 | 3630 | 1.84 |
| 162 | 29,930 | 5100 | 5.87 |
| 192 | 46,810 | 4890 | 9.57 |
| 216 | 94,750 | 5210 | 18.2 |
| 235 | 207,000 | 5390 | 38.4 |
| 242 | gel | | |

Figure 5:
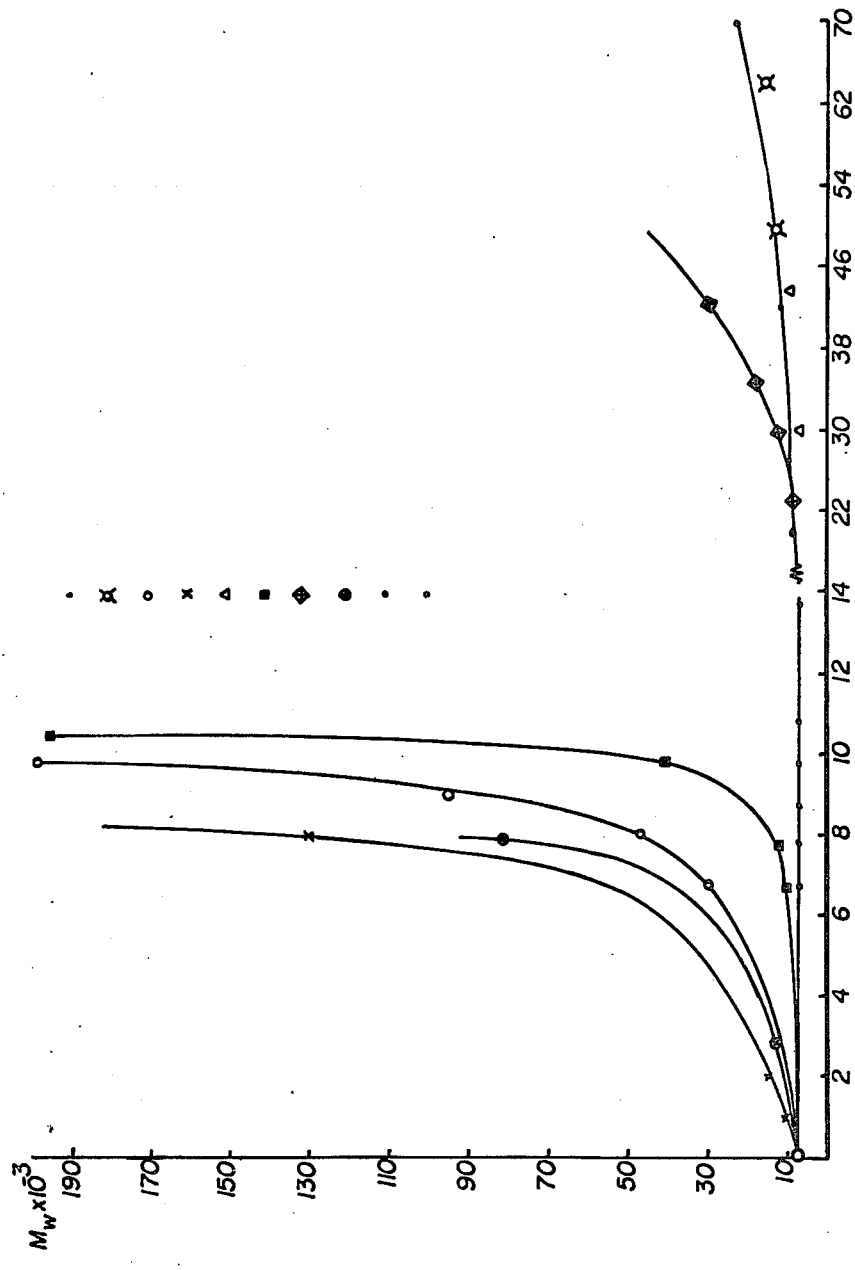
FIG. 5 is a graph of variation of molecular weight as ordinate against time in days as abscissa.
Figure 6:
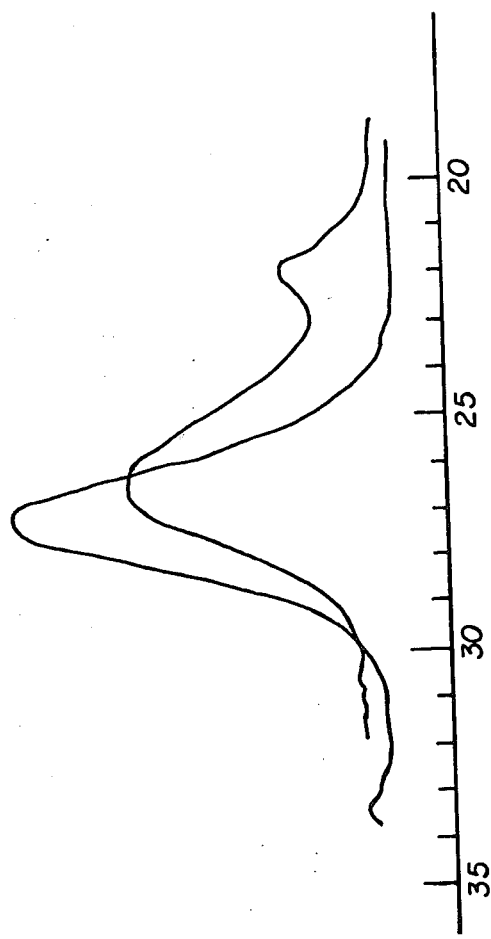
FIG. 6 is a gel permation chromatography curve.

The hydroxyl-terminated polybutadiene/ammonium perchlorate/epoxide similar to 3,4 epoxycyclohexylmethyl 3',4'-epoxy cyclohexane carboxylate mixture also forms a gel after 11 days (see FIG. 5). If an antioxidant is added (PBNA or 2,2'methylene bis(4-methyl-6-tert-butyl) phenol to the mixtures of hydroxyl-terminated polybutadiene/ammonium perchlorate (see Table V below and FIG. 5), hydroxyl-terminated polybutadiene/ammonium perchlorate/chromium oleate (FIG. 6) or hydroxylterminated polybutadiene/chromium oleate (FIG. 5), no polymerization occurs at 60° C., but the hydroxyl-terminated/PBNA/ammonium perchlorate/epoxide similar to 3,4 epoxycyclohexylmethyl 3',4'-epoxycyclohexane carboxylate mixture (see Table VI, below, and FIG. 5) polymerizes after 40 days of reaction at that temperature. If a catalyst such as, for example, chromium oleate (see Table VII, below, FIG. 5) is added to the last mixture, gel formation occurs after eight days of reaction and two condensation products are formed with high molecular weights. The proportion of the higher molecular weight increases with the reaction time by the addition of molecules of polybutadiene units to the primary or secondary hydroxyl groups until gel is formed (Table VIII FIG. 6).

TABLE V

Gel Permeation Chromatography Molecular Weights of hydroxyl-terminated polybutadiene/PBNA/ammonium perchlorate mixture at 60° C. under Nitrogen with Time Hydroxyl-terminated polybutadiene: 49g; PBNA: 1.0g; ammonium perchlorate 200 μm, ammonium perchlorate 10 μm in 5 to 3 respective weight ratio: 25g.

| Time Days | $M_w$ | $M_n$ | $M_w/M_n$ |
|---|---|---|---|
| 0 | 6320 | 3680 | 1.72 |
| 1.75 | 6940 | 3830 | 1.81 |
| 2.85 | 6860 | 3870 | 1.77 |
| 6.75 | 6570 | 3710 | 1.77 |
| 7.80 | 6690 | 3880 | 1.72 |
| 8.75 | 6830 | 3860 | 1.77 |
| 9.75 | 6630 | 3800 | 1.74 |
| 10.80 | 6780 | 3730 | 1.81 |
| 23.00 | 6840 | 3840 | 1.78 |
| 29.80 | 6900 | 3770 | 1.83 |

TABLE VI

Gel Permeation Chromatography Molecular Weights of hydroxyl-terminated polybutadiene/ammonium perchlorate/ epoxide similar to 3,4 epoxycyclohexylmethyl 3',4'-epoxy cyclohexane carboxylate Mixture at 60° C. under Nitrogen with Time Hydroxyl-terminated polybutadiene: 43.7g; PBNA: 0.88g; ammonium perchlorate 200 um and ammonium perchlorate 10 um in 5 to 3 respective weight ratio: 25 g; epoxide similar to 3,4 epoxycyclohexylmethyl 3',4'-epoxycyclohexane carboxylate: 5.375

| Time Days | $M_w$ | $M_n$ | $M_w/M_n$ |
| --- | --- | --- | --- |
| 0 | 6320 | 3680 | 1.72 |
| 1.75 | 6630 | 3750 | 1.76 |
| 2.85 | 6520 | 3780 | 1.72 |
| 6.75 | 6570 | 3770 | 1.74 |
| 7.80 | 6630 | 3770 | 1.76 |
| 8.75 | 6970 | 3850 | 1.81 |
| 9.75 | 6870 | 3800 | 1.80 |
| 10.75 | 6670 | 3840 | 1.74 |
| 13.75 | 6860 | 3990 | 1.75 |
| 16.75 | 7160 | 3850 | 1.86 |
| 23.00 | 8150 | 4230 | 1.92 |
| 29.80 | 12600 | 4540 | 2.77 |
| 34.80 | 18260 | 4900 | 3.73 |

TABLE VII

Gel Permeation Chromatography Molecular Weights of hydroxyl-terminated polybutadiene/ammonium perchlorate/ epoxide similar to 3,4 epoxycyclohexylmethyl 3',4'-epoxy cyclohexane carboxylate Mixture at 60° C. under Nitrogen with Time Hydroxyl-terminated polybutadiene: 45.25g; ammonium perchlorate 200 um and ammonium perchlorate 10 um in 5 to 3 respective weight ratio: 25 g; epoxide similar to 3,4 epoxycyclohexylmethyl 3',4'-epoxycyclohexane carboxylate: 4.767g.

| Time Days | $M_w$ | $M_n$ | $M_w/M_n$ |
| --- | --- | --- | --- |
| 0 | 7700 | 3870 | 1.98 |
| 1.75 | 8470 | 3980 | 2.13 |
| 2.85 | 7840 | 3870 | 2.02 |
| 6.75 | 10,570 | 4150 | 2.54 |
| 7.80 | 12,600 | 4400 | 2.86 |
| 8.80 | 11,250 | 4410 | 2.55 |
| 9.80 | 40,400 | 4850 | 8.32 |
| 10.75 | 200,900 | 4940 | 52.8 |
| 13.70 | gel | | |

TABLE VIII

Gel Permeation Chromatography Molecular Weights of the Reaction Product hydroxyl-terminated polybutadiene/ epoxide similar to 3,4 epoxycyclohexylmethyl 3',4'- epoxycyclohexane carboxylate with Time at 60° C.

Hydroxyl-terminated polybutadiene: 64.98g; 2,2' methylene bis(4-methyl-6-tert-butyl)phenol: 1.3g; chromium oleate: 2g; epoxide similar to 3,4 epoxycyclohexylmethyl 3',4'- epoxycyclohexane carboxylate: .71g; = 60° C.

| Time Days | $M_w$ | $M_n$ | $M_w/M_n$ |
| --- | --- | --- | --- |
| 0 | 7050 | 4180 | 1.68 |
| 27 | 10080 | 4290 | 2.35 |
| 35 | 11700 | 4370 | 2.67 |
| 48 | 13380 | 4600 | 2.91 |
| 64 | 15190 | 4620 | 3.29 |
| 84 | 24600 | 4670 | 5.26 |

In summary, it is seen that, in the absence of an antioxidant, it is possible to polymerize the hydroxyl-terminated polybutadiene very quickly in the presence of ammonium perchlorate, whereas, in the presence of an antioxidant, both the ammonium perchlorate and the epoxide are both necessary, since the chromium oleate serves only to accelerate the polyetherification reaction, i.e. the formation of polyether links between the epoxide and the hydroxyl group of the polybutadiene.

The mechanical properties of binders as determined by means of the Instron were used in evaluating the different ingredients, determining the optimum proportions of each ingredient and studying the behaviour of propellants during mixing.

EXAMPLE IX

Polyester binders from reaction product of hydroxyl-terminated polybutadiene and succinic anhydride.

By cooking carboxylated hydroxyl-terminated polybutadiene (hydroxyl-terminated polybutadiene/succinic anhydride) with the different epoxides at 60° C. in the presence of chromium oleate, it is shown that ERL 4221 (3,4 epoxycyclohexylmethyl 3',4'-epoxycyclohexane carboxylate from Union Carbide Can. Ltd.) (or CY 179 [epoxide similar to 3,4 epoxycyclohexylmethyl 3',4'-epoxycyclohexane carboxylate sold by Ciba Products Co.] or EP 201 (epoxide similar to ERL 4221 sold by Union Carbide Canada Ltd., Belleville, Ontario, equivalent weight: 132 g.) gives one of the best rubbers of all the epoxides studies. The ERL 4289 [bis(3,4-epoxy-6-methylcyclohexylmethyl) adipate], which has a similar structure to the ERL 4221, produces a rubber of equivalent strength but requires a longer cooking time (see Table IX below).

TABLE IX

Composition and Mechanical Properties of Polyester Binders from reaction product of hydroxyl-terminated polybutadiene and succinic anhydride and Epoxides Chromium oleate: 0.5% of the binder; Temp. of curing:60° C.

| Batch No. | Epoxide Name | Equiv. | Curing time days | $o_m$ MPa | $\epsilon_m$ cm/cm | E MPa | Energy J |
| --- | --- | --- | --- | --- | --- | --- | --- |
| 1 | ERL 4221 | 1.0 | 7 | 0.481 | 8.29 | 0.142 | 1.71 |
| 2 | ERL4221 | 1.2 | 7 | 0.449 | 11.14 | 0.096 | 1.88 |
| 3 | ERL4221 | 0.95 | 7 | 0.349 | 9.93 | 0.086 | 1.45 |
| 4 | ERL4221 | 0.90 | 7 | 0.251 | 12.5 | 0.058 | 1.16 |
| 5 | EPON 812 | 1.0 | 7 | 0.358 | 4.32 | 0.165 | 0.73 |
| 6 | EPON 812 | 1.2 | 7 | 0.453 | 2.27 | 0.307 | 0.55 |
| 7 | ERLA 0510 | 1.0 | 7 | 0.392 | 3.03 | 0.190 | 0.56 |
| 8 | ERL 4289 | 1.0 | 14 | 0.437 | 11.4 | 0.081 | 1.83 |
| 9 | DER 732 | 1.0 | 14 | 0.295 | 14.3 | 0.034 | 1.33 |
| 10 | EPOTUF-37-151 | 1.17 | 14 | 0.189 | 6.8 | 0.042 | 0.51 |

ERL 4221: 3,4 epoxycyclohexylmethyl 3',4'-epoxycyclohexane carboxylate from Union Carbide Can. Ltd.; Equiv. weight: 135 g.
ERL 4289: bis(3,4-epoxy-6-methyl-cyclohexylmethylmethyl) adipate;Equiv. Wt.192g
EPON 812: derivative of triglycidyl glycerol from Shell Chemical Co., N.Y. Equiv. weight: 153g.
ERLA 0510: N,N-diglycidyl-p-aminophenyl glycidyl ether from Union Carbide Can. Ltd., Equiv. weight: 89g.
DER 732: diglycidyl ether of polyoxypropylene glycol, Equiv. weight: 310g.EPOTUF-37-151: epoxy derivative of sebacic acid from Reicholds Chemicals, Inc., Tuxedo Park, N.Y. Equiv. weight: 354 g.

EXAMPLE X

Polyester binders from reaction product of hydroxyl-terminated polybutadiene and cis-1,2-cyclohexanedicarboxylic anhydride.

Cooking the reaction product of hydroxyl-terminated polybutadiene and cis-1,2-cyclohexane dicarboxylic anhydride derivative with the different epoxides at 60° C. in the presence of chromium oleate produces binders with mechanical properties similar to those obtained with the reaction product of hydroxyl-terminated polybutadiene and succinic anhydride derivative.

EXAMPLE XI

Polyester binders made from a mixture of hydroxyl-terminated polybutadiene, cis-1,2-cyclohexanedicarboxylic anhydride and epoxides.

Dihydroxylated polybutadiene (hydroxyl-terminated polybutadiene) containing PBNA and different epoxides (EP 201, epoxide similar to ERL 4221 sold by Union Carbide Canada Ltd., Belleville, Ontario, ERL 4221, 3,4 epoxycyclohexylmethyl 3',4'-epoxycyclohexane carboxylate from Union Carbide Can. Ltd.; CY 179, epoxide similar to 3,4 epoxycyclohexylmethyl-3',4'-epoxycyclohexane carboxylate; or ERL 4289, bis[3,4-epoxy-6-methylcyclohexylmethyl] adipate, etc.) in the presence of chromium oleate do not form gel at cooking temperatures as high as 125° C. If, however, ammonium perchlorate is added, cooking occurs after eight days at approximately 60° C. Cooking is obtained in the absence of ammonium perchlorate at 80° C. if cis-1,2-cyclohexanedicarboxylic anhydride is added to the hydroxyl-terminated polybutadiene/epoxide/chromium oleate mixture. However, no reaction occurs in the presence of methyldiethanolamine; hydroxyl-2 ethylaziridine, ethyleneimine, triethanolamine, methyl-N-morpholine, hydroxylamine, ε-caprolactone, γ-valerolactone, methylhydrazine or glutaric anhydride at 100° C. By determining the mechanical properties of these binders, it may be seen that they are less resistant than those prepared from the reaction product of hydroxyl-terminated polybutadiene and succinic anhydride or the reaction product of hydroxyl-terminated polybutadiene and cis-1,2-cyclohexanedicarboxylic anhydride. Cooking is slower and has to be carried out at a higher temperature (see Table X below).

Composition and Mechanical Properties of Polyester Binders from reaction product of hydroxyl-terminated polybutadiene and cis-1,2-cyclohexanedicarboxylic anhydride and Epoxides Hydroxyl-terminated polybutadiene: 1.0 mole; PBNA: 2% of hydroxyl-terminated polybutadiene; cis-1,2-cyclohexanedicarboxylic anhydride: 1.0 mole.

| Batch No | Epoxides CY 179 Moles | Epoxides Der 736 Moles | Chromium Oleate % | Curing temp. °C. | $V_r$ | Gel % | $\sigma_m$ MPa | $\epsilon$ cm/cm | E MPa | Energy J |
|---|---|---|---|---|---|---|---|---|---|---|
| 11 | 1.2 | 0 | 2.0 | 100 | 0.058 | 65.4 | 0.265 | 4.30 | 0.129 | 0.38 |
| 12 | " | 0 | " | 80 | 0.016 | 48.4 | 0.137 | 7.97 | 0.050 | 0.35 |
| 13 | " | 0 | 0 | 80 | 0.040 | 61.6 | 0.159 | 5.16 | 0.067 | 0.27 |
| 14 | 0.5 | 0.5 | 2.0 | 80 | 0.037 | 62.0 | 0.19 | 5.31 | 0.065 | 0.32 |

CY 179: Epoxide similar to 3,4 epoxycyclohexylmethyl 3',4'-epoxycyclohexane carboxylate
Der 736: Epoxide similar to diglycidyl ether of polyoxypropylene glycol having an equiv. weight of 178 g.
$V_r$: volume fraction of crosslinked rubber in swollen sample of rubber in benzene

EXAMPLE XII

Polyester propellants from reaction product of hydroxyl-terminated polybutadiene and succinic anhydride.

The mechanical properties of polyester propellants containing the reaction product of hydroxyl-terminated polybutadiene and succinic anhydride binder and epoxides were determined at 22.8° and −45.5° C. The energy of the binder tends to grow with the increase in the proportion of epoxide and the cooking time at 60° C. The energy of the binder increases from 0.65 to 0.80 after 56 days of aging; the elongation remains constant, but the strain at maximum elongation ($\theta_m$) increases from 0.40 to 0.60 MPa. The addition of the reaction product of N-methyldiethanolamine and sebacic acid with carboxyl end groups improves the mechanical properties at ambient temperature but does not affect the low elongation observed at −45.5° C. (Test No. 21, 24 and 26, Table XI). The addition of the reaction product of tris(2-methyl-1-aziridinyl) phosphine oxide with diacids (aziridine polyester) improves neither the properties at ambient temperature (22.8° C.), not those observed at −45.5° C. (Test No. 26, Table XI). The use of a mixture of two epoxides, one of which had a long-chain structure (DER 732 (diglycidyl ether of polyoxypropylene glycol), shows an improvement in the elongation, but does not modify the binder energy. (Table XI).

TABLE XI

Mechanical Properties of Polyester Propellants from Reaction Product of hydroxyl-terminated polybutadiene and succinic anhydride Reaction product of hydroxyl-terminated polybutadiene and succinic anhydride
Equiv. wt.:1500; Curing temp: 60° C.; Curing time: to constant shore hardness; Solids 88%
(70% ammonium perchlorate of 400, 200 and 17 μm in respective weight rates of 1.7/2.7/1.0 and 18% Al H-15; Chromium oleate: 1.0% of binder

| Batch No. | EP201 Moles | IDP % | surface-active Agents Name | surface-active Agents % | Test °C. | Aging Days | $\sigma_m$ MPa | $\sigma_r$ MPa | $\epsilon_m$ cm/cm | $\epsilon_r$ cm/cm | E MPA | Energy J |
|---|---|---|---|---|---|---|---|---|---|---|---|---|
| 15 | 1.2 | 20 | — | — | 22.8 | 0 | 0.524 | 0.523 | 0.194 | 0.198 | 5.91 | 1.08 |
| 16 | 1.2 | 20 | — | — | 22.8 | 0 | 0.619 | 0.619 | 0.178 | 0.178 | 9.20 | 0.60 |
| 17 | 1.0 | 20 | — | — | 22.8 | 0 | 0.670 | 0.670 | 0.108 | 0.108 | 11.37 | 0.63 |
| 18 | 0.95 | 20 | — | — | 22.8 | 0 | 0.655 | 0.651 | 0.106 | 0.111 | 10.07 | 0.60 |
| 19 | 0.09 | 20 | — | — | 22.8 | 0 | 0.499 | 0.497 | 0.136 | 0.144 | 6.42 | 0.65 |
| 20 | 0.85 | 20 | — | — | 22.8 | 0 | 0.405 | 0.404 | 0.147 | 0.148 | 4.37 | 0.44 |
| 21 | 0.85 | 25 | — | — | 22.8 | 0 | 0.396 | 0.393 | 0.185 | 0.185 | 3.41 | 0.65 |
|  |  |  | — | — | 22.8 | 28 | 0.509 | 0.507 | 0.188 | 0.193 | 4.12 | 0.82 |
|  |  |  | — | — | 22.8 | 56 | 0.599 | 0.595 | 0.197 | 0.199 | 5.26 | 0.80 |
|  |  |  | — | — | −45.5 | 0 | 2.59 | 2.58 | 0.088 | 0.089 | 9.70 | 2.98 |
|  |  |  | — | — | −45.5 | 56 | 3.18 | 3.17 | 0.077 | 0.085 | 10.49 | 3.18 |

TABLE XI-continued

Mechanical Properties of Polyester Propellants from Reaction Product of hydroxyl-terminated polybutadiene and succinic anhydride

Reaction product of hydroxyl-terminated polybutadiene and succinic anhydride
Equiv. wt.:1500; Curing temp: 60° C.; Curing time: to constant shore hardness; Solids 88%
(70% ammonium perchlorate of 400, 200 and 17 μm in respective
weight rates of 1.7/2.7/1.0 and 18% Al H-15; Chromium oleate: 1.0% of binder

| Batch No. | EP201 Moles | IDP % | surface-active Agents Name | % | Test °C. | Aging Days | $\sigma_m$ MPa | $\sigma_r$ MPa | $\epsilon_m$ cm/cm | $\epsilon_r$ cm/cm | E MPA | Energy J |
|---|---|---|---|---|---|---|---|---|---|---|---|---|
| 22 | 0.85 | 23.2 | N8C | 0.3 | 22.8 | 0 | 0.516 | 0.515 | 0.095 | 0.095 | 10.81 | 0.48 |
| 23 | 0.85 | 23.5 | N8C | 0.5 | 22.8 | 0 | 0.643 | 0.643 | 0.097 | 0.097 | 13.47 | 0.60 |
| 24 | 0.85 | 24.0 | N8C | 1.0 | 22.8 | 0 | 0.414 | 0.411 | 0.138 | 0.192 | 4.64 | 0.55 |
|  |  |  |  |  | 22.8 | 56 | 0.666 | 0.657 | 0.253 | 0.270 | 5.51 | 1.38 |
|  |  |  |  |  | −45.5 | 0 | 3.02 | 3.02 | 0.088 | 0.088 | 10.87 | 3.84 |
|  |  |  |  |  | −45.5 | 56 | 3.17 | 3.15 | 0.100 | 0.122 | 8.43 | 5.72 |
| 25 | 0.95 | 21.6 | PEA | 2.4 | 22.8 | 0 | 0.694 | 0.595 | 0.099 | 0.101 | 11.66 | 0.61 |
| 26 | 0.85 | 22.6 | PEA | 2.4 | 22.8 | 0 | 0.586 | 0.596 | 0.108 | 0.110 | 7.02 | 0.48 |
|  |  |  |  |  | 22.8 | 28 | 0.786 | 0.767 | 0.116 | 0.117 | 8.76 | 0.64 |
|  |  |  |  |  | 22.8 | 56 | 0.889 | 0.888 | 0.142 | 0.142 | 8.84 | 0.95 |
|  |  |  |  |  | −45.5 | 0 | 3.49 | 3.49 | 0.091 | 0.112 | 5.16 | 3.10 |
|  |  |  |  |  | −45.5 | 56 | 4.09 | 4.08 | 0.090 | 0.093 | 11.25 | 3.00 |

EP201: Epoxide similar to ERL 4221 sold by Union Carbide Can.Ltd. Equiv. wt. 132g.
N8C: Reaction product of N-methyl-di-(ehtanolamine) & sebacic acid with carboxyl end groups
PEA: Reaction product of tris(2-methyl-1-aziridinyl) phosphine oxide with diacids (aziridine polyester)

TABLE XII

Mechanical Properties of Polyester Propellants from reaction product of hydroxyl-terminated polybutadiene and succinic anhydride and a mixture of epoxides

Reaction product of hydroxyl-terminated polybutadiene and succinic anhydride, Equiv. weight:
1500; Curing temp: 60° C.; Curing time: to constant shore hardness; Solids 88% (70%
ammonium perchlorate of 400, 200 and 17 um in respective weight ratio of 1.7/2.7/1.0
and 18% Al H-15); Chromium oleate: 1% of binder; test temperature: 22.8° C.

| Batch No. | Epoxides EP201 Moles | DER732 Moles | REC[1] | IDP % | N8C % | $\sigma_m$ MPa | $\sigma_r$ MPa | $\epsilon_m$ cm/cm | $\epsilon_r$ cm/cm | E MPa | Energy J |
|---|---|---|---|---|---|---|---|---|---|---|---|
| 27 | 0.637 | 0.213 | 0.85 | 23.5 | 0.5 | 0.474 | 0.474 | 0.180 | 0.180 | 5.40 | 0.81 |
| 33 | 0.60 | 0.20 | 0.80 | 23.5 | 0.5 | 0.305 | 0.304 | 0.228 | 0.232 | 2.53 | 0.54 |
| 34 | 0.60 | 0.20 | 0.80 | 23.5 | 0.8 | 0.284 | 0.282 | 0.214 | 0.222 | 2.42 | 0.60 |
| 35 | 0.60 | 0.20 | 0.80 | 23.5 | 1.1 | 0.233 | 0.229 | 0.225 | 0.238 | 2.01 | 0.45 |

[1]RRC: Equiv. Ratio of epoxide to carboxyl
N8C: Reaction product of N-methyldiethanolamine and sebacic acid with carboxyl end groups
EP201: Epoxide similar to ERL 4221 sold by Union Carbide Canada Ltd., Equiv. weight: 132g.
DER732: diglycidyl ether of polyoxypropylene glycol; Equiv. weight: 310g.
IDP: Isodecyl pelargonate

EXAMPLE XIII

Polyester propellants from precondensed reaction product of hydroxylterminated polybutadiene and cis-1,2-cyclohexanedicarboxylic anhydride,

The mechanical properties of propellants containing the reaction product of hydroxyl-terminated polybutadiene and cis-1,2-cyclohexane dicarboxylic anhydride binder are slightly inferior to those of propellants made from the reaction product of hydroxyl-terminated polybutadiene and succinic anhydride. The elongation at low temperature (−45.5° C.) is reduced to half its ambient temperature value. The addition of the surface agents the reaction product of N-methyldiethanolamine and sebacic acid with carboxyl end groups and the reaction product of tris(2-methyl-1-aziridinyl) phosphine oxide with diacids (aziridine polyester) increases the binder energy, but does not improve the low temperature behaviour (see Table XIII below).

TABLE XIII

Mechanical Properties of Polyester Propellants from reaction product hydroxyl-terminated polybutadiene and cis-1,2-cyclohexane dicarboxylic anhydride

Hydroxyl-terminated polybutadiene, Equiv. weight: 1420g; Curing Temp: 60° C; Curing time: to constant
shore hardness; Solids 88% (70% ammonium perchlorate 400, 200 and 17 μm in respective ratio of 1.7/2.7/1.0
and 18% Al H-15; Chromium oleate: 2% of binder

| Batch No. | Epoxide Name | Mole | IDP | Surface active Agent Name | % | Curing Temp °C. | Days | Shore hardness MPa | Test Temp °C. | $\sigma_m$ MPa | $\sigma_p$ MPa | $\epsilon_m$ cm/cm | $\epsilon_r$ cm/cm | E MPa | Energy J |
|---|---|---|---|---|---|---|---|---|---|---|---|---|---|---|---|
| 61 | CY179 | 1.0 | 23.0 | — | — | 60 | 14 | 0.65 | 22.8 | 0.710 | 0.708 | 0.145 | 0.146 | 8.06 | 0.77 |
| 60 | CY179 | 1.0 | 23.0 | Fe$_2$O$_3$ | 2.0 | 60 | 7 |  | 22.8 | 0.507 | 0.503 | 0.176 | 0.189 | 4.08 | 0.80 |
|  |  |  |  | Fe$_2$O$_3$ | 2.0 | 60 | 7 | 0.05 | −45.5 | 2.96 | 2.96 | 0.088 | 0.091 | 64.4 | 3.50 |
|  |  |  |  | Fe$_2$O$_3$ | 2.0 | 60 | 35 | 0.65 | 22.8 | 0.532 | 0.530 | 0.183 | 0.190 | 4.17 | 0.76 |
|  |  |  |  | Fe$_2$O$_3$ | 2.0 | 60 | 63 | 0.65 | 22.8 | 0.576 | 0.573 | 0.184 | 0.194 | 4.45 | 0.85 |
|  |  |  |  | Fe$_2$O$_3$ | 2.0 | 60 | 63 | 0.65 | −45.5 | 3.11 | 3.11 | 0.081 | 0.088 | 74.5 | 3.31 |
| 62 | CY179 | 1.0 | 22.7 | N8C | 0.3 | 80 | 13 | 0.75 | 22.8 | 0.771 | 0.771 | 0.076 | 0.076 | 16.21 | 0.50 |

TABLE XIII-continued

Mechanical Properties of Polyester Propellants from reaction product hydroxyl-terminated polybutadiene and cis-1,2-cyclohexane dicarboxylic anhydride Hydroxyl-terminated polybutadiene, Equiv. weight: 1420g; Curing Temp: 60° C; Curing time: to constant shore hardness; Solids 88% (70% ammonium perchlorate 400, 200 and 17 μm in respective ratio of 1.7/2.7/1.0 and 18% Al H-15; Chromium oleate: 2% of binder

| Batch No. | Epoxide Name | Mole | IDP | Surface active Agent Name | % | Curing Temp °C. | Days | Shore hardness MPa | Test Temp °C. | $\sigma_m$ MPa | $\sigma_p$ MPa | $\epsilon_m$ cm/cm | $\epsilon_r$ cm/cm | E MPa | Energy J |
|---|---|---|---|---|---|---|---|---|---|---|---|---|---|---|---|
| 63 | CY179 | 1.0 | 22.7 | N8C | 0.3 | 60 | 13 | 0.56 | 22.8 | 0.639 | 0.632 | 0.270 | 0.305 | 6.86 | 1.70 |
| 66 | CY179 | 1.0 | 22.6 | PEA | 2.4 | 60 | 29 | 0.73 | 22.8 | 0.778 | 0.778 | 0.119 | 0.131 | 9.85 | 0.847 |
| 67 | CY179 | 1.2 | 22.6 | PEA | 2.4 | 60 | 18 | 0.64 | 22.8 | 0.694 | 0.682 | 0.164 | 0.186 | 8.23 | 1.20 |
| 65 | CY179 | 1.0 | 21.9 | PEA/N8C | 0.9/0.2 | 60 | 16 | 0.70 | 22.8 | 0.748 | 0.737 | 0.149 | 0.161 | 8.80 | 0.99 |
| 68 | ERL4289 | 1.0 | 21.9 | PEA/N8C | 0.9/0.2 | 60 | 23 | 0.52 | 22.8 | 0.532 | 0.527 | 0.243 | 0.249 | 5.25 | 1.12 |
| 69 | EPON812 | 1.0 | 21.9 | PEA/N8C | 0.9/0.2 | 60 | 15 | 0.71 | 22.8 | 0.785 | 0.784 | 0.068 | 0.068 | 16.62 | 0.38 |

CY179: Epoxide similar to 3,4-epoxycyclohexylmethyl 3',4'-epoxy cyclohexane carboxylate
ERL4289: bis(3,4-epoxy-6-methyl-cyclohexylmethyl) adipate
EPON812: Derivative of triglycidyl glycerol, Equiv. weight: 153 g.
N8C: Reaction product of N-methyldiethanolamine and sebacic acid with carboxyl end groups
PEA: Reaction product of tris(2-methyl-1-aziridinyl)phosphine oxide with diacids (aziridine polyester)
IDP: Isodecyl pelargonate

EXAMPLE XIV

Polyester propellants from a mixture of hydroxyl-terminated polybutadiene, cis-1,2-cyclohexanedicarboxylic anhydride and epoxides.

The mechanical properties of these polyester propellants are given in Table XIV below. They contain 88% solids and are prepared from hydroxylterminated polybutadiene, an epoxide similar to 3,4 epoxycyclohexylmethyl 3',4'-epoxycyclohexane carboxylate, cis-1,2-cyclohexane dicarboxylic anhydride and chromium oleate. Their mechanical properties are slightly inferior to those of the prereacted reaction product of hydroxyl-terminated polybutadiene and cis-1,2-cyclohexanedicarboxylic anhydride polyester propellants, and they require a higher cooking temperature and longer cooking times. The low temperature elongation is also quite low. The addition of the surface agent reaction product of tris(2-methyl-1-aziridinyl) phosphine oxide with diacids (aziridine polyester) improves their mechanical properties at ambient temperature and the energy increases from 0.57 to 0.83 J. Nevertheless, the low temperature properties are as low as those of the reaction product of hydroxyl-terminated polybutadiene and succinic anhydride reaction product of hydroxyl-terminated polybutadiene and cis-1,2-cyclohexanedicarboxylic anhydride binders.

TABLE XIV

Mechanical Properties of Polyester Propellants made from the reaction product of hydroxyl-terminated polybutadiene and cis-1,2-cyclohexane dicarboxylic anhydride/epoxide mixture Hydroxyl-terminated polybutadiene Equiv. weight: 1420g; Curing temp: 80° C.; Curing Time; to constant shore hardness; Solids 88% (70% ammonium perchlorate of 400, 200 and 17 um in respective weight ratio of 1.7/2.7/1.0 and 18% Al H-15; Epoxide: similar to 3,4 epoxycyclohexylmethyl 3',4'-epoxy cyclohexane carboxylate

| Batch No. | Epoxide Mole | ACHD Mole | Catalyst Name | % | TDP | Surface-active Agent Name | % | Curing Day | Shore Hard-ness | Mech Test °C. | $\sigma_m$ MPa | $\sigma_r$ MPa | $\epsilon_m$ cm/cm | $\epsilon_r$ cm/cm | E MPa | Energy J |
|---|---|---|---|---|---|---|---|---|---|---|---|---|---|---|---|---|
| 146 | 1.2 | 1.2 | Ol-Cr | 2.0 | 23.0 | — | — | — | | 22.8 | 0.545 | 0.245 | 0.165 | 0.165 | 4.55 | 0.57 |
| 147 | 1.2 | 1.2 | " | 2.0 | 20.6 | PEA | 2.4 | 21 | — | 22.8 | 0.584 | 0.584 | 0.178 | 0.178 | 6.58 | 0.83 |
| 125 | 1.0 | 1.0 | " | 2.0 | 20.6 | PEA | 2.4 | 12 | — | 22.8 | 0.383 | 0.383 | 0.122 | 0.126 | 4.42 | 0.36 |
| | | | | | | | | | | −45.5 | 1.80 | 1.80 | 0.087 | 0.087 | 6.94 | 2.21 |
| | | | | | | | | | | −59.4 | 2.49 | 2.49 | 0.071 | 0.071 | 10.54 | 2.64 |
| 145 | 1.2 | 1.2 | " | 2.0 | 22.5 | N8C | 0.5 | 12 | — | 22.8 | 0.224 | 0.224 | 0.189 | 0.189 | 1.65 | 0.28 |
| 150 | 1.2 | 1.2 | " | 2.0 | 20.6 | ADH-2 | 2.4 | 30 | — | 22.8 | 0.234 | 0.234 | 0.084 | 0.084 | 6.28 | 0.22 |
| 148 | 1.2 | 1.2 | " | 2.0 | 20.6 | ADH-3 | 2.4 | 21 | — | 22.8 | 0.575 | 0.572 | 0.125 | 0.126 | 8.83 | 0.56 |
| 173 | 1.2 | 1.2 | " | 2.0 | 22.0 | PEA/N8C | 0.6/0.4 | 23 | — | 22.8 | 0.500 | 0.500 | 0.123 | 0.123 | 6.55 | 0.44 |
| 185 | 1.0 | 1.0 | Or-Cr | 0.5 | 24.5 | — | — | 13 | 0.47 | 22.8 | 0.386 | 0.386 | 0.124 | 0.124 | 4.77 | 0.36 |
| 183 | 1.0 | 1.0 | " | 0.5 | 22.1 | PEA | 2.4 | 18 | 0.31 | 22.8 | 0.213 | 0.213 | 0.161 | 0.161 | 1.89 | 0.25 |
| 187 | 1.0 | 1.0 | " | 0.5 | 24.2 | N8C | 0.3 | 12 | 0.36 | 22.8 | 0.268 | 0.266 | 0.162 | 0.168 | 2.75 | 0.33 |
| 186 | 1.0 | 1.0 | " | 0.5 | 23.4 | PEA/N8C | 0.9/0.2 | 12 | 0.33 | 22.8 | 0.242 | 0.242 | 0.158 | 0.158 | 2.12 | 0.28 |

ACHD: cis-1,2-cyclohexane anhydride
IDP: Isodecyl pelargonate
PEA: Reaction product of tris(2-methyl-1-azizidinyl) phosphine oxide with diacids (aziridine polyester)
N8C: Reaction product of N-methyl-di(w hydroxyl-ethyl)amine and sebacic acid with carboxyl end groups
ADH-2: Condensation product of methyldiethanolamine, 2-hydroxyethylaziridine and sebacic acid
ADH-3: Condensation product of dimeric diisocyanate and 2-hydroxyethylaziridine

EXAMPLE XV

Polyether propellants

Hydroxyl-terminated polybutadiene was cross-linked with the epoxides. The formation of polyether is far slower than that of polyester and requires a far higher temperature. The use of chromium salts as catalysts in the absence of perchlorate gives no result at relatively high temperatures. However, in the presence of ammonium perchlorate and chromium salts, cooking of hydroxyl-terminated polybutadiene with the epoxides occurs at a temperature above 60° C. In the presence of an initiator, the hydroxyl-terminated polybutadiene reacts with the diepoxide to produce the polyether links. Polyether formation is favoured by the presence of amines of carboxylic acids and ammonium perchlorate. At temperatures between 100° and 110° C. in the presence of ammonium perchlorate, the expoxides are transformed into vitreous, brittle polyepoxides. At between 60° and 90°, however, the polyetherification reaction is favoured and the epoxide reacts with the diol. The glass transformation point (Tg) of the polyether propellant measured by DSC is between −78° and −79° C. An initial series of propellants prepared from hydroxylterminated polybutadiene with 2% PBNA in the presence of chromium oleate or octanoate was cooked at between 90° and 110° C. The mechanical properties of propellants prepared with decreasing quantities of epoxides at this reaction temperature are very disappointing and are not improved by the addition of surface active agents (see Table XV, below). However, by using hydroxyl-terminated polybutadiene with the addition of a known quantity of antioxidant and assuming that the antioxidant reacts with the epoxide, propellants are obtained with energies comparable to that of polyesters. The cooking times at 60° C. are very long and, in general, periods of 25 to 60 days are necessary to obtain constant hardness. The use of finer perchlorate would seem to improve the mechanical properties (Tests No. 51 and 45, Table XV, below), that gives a larger solid surface to be covered by the epoxide, provides a better catalysis of the ammonium perchlorate.

TABLE XV

Mechanical Properties of Polyether Propellants from Hydroxyl-terminated polybutadiene with 2% of PBNA Hydroxyl-terminated polybutadiene Equiv. weight: 1420; Curing time; to constant shore hardness; Epoxide: similar to 3,4 epoxycyclohexylmethyl 3',4'-epoxycyclohexane carboxylate; Solids 88% (70% ammonium perchlorate of 400, 200 and 17 μm in respective weight rates of 1.7/2.7/1.0 and 18% Al H-15)

| Batch No. | Epoxide Mole | Catalyst Name | % | IDP % | Surface-active Agent Name | % | Curing °C. | Test Temp. °C. | $\sigma_m$ MPa | $\sigma_r$ MPa | $\epsilon_m$ cm/cm | $\epsilon_r$ cm/cm | E HPa | Energy J |
|---|---|---|---|---|---|---|---|---|---|---|---|---|---|---|
| 36 | 1.0 | Cr Ol | 0.3 | 20 | — | — | 110 | 22.8 | 0.355 | 0.352 | 0.232 | 0.251 | 2.52 | 0.69 |
| 37 | 1.0 | Cr Ol | 0.6 | 20 | — | — | 100 | 22.8 | 0.228 | 0.225 | 0.248 | 0.255 | 1.36 | 0.42 |
| 38 | 1.0 | Cr Oc | 0.23 | 22.4 | PEA | 2.4 | 90 | −45.5 | 0.710 | 0.708 | 0.087 | 0.091 | 17.3 | 6.2 |
| 39 | 0.95 | Cr Oc | 0.24 | 24.2 | N8C | 0.5 | 90 | 22.8 | 0.227 | 0.227 | 0.095 | 0.095 | 3.2 | 0.16 |
| 40 | 0.80 | Cr Oc | 0.24 | 24.2 | N8C | 0.5 | 90 | 22.8 | 0.138 | 0.138 | 0.124 | 0.124 | 1.9 | 0.12 |

CrOl: Chromium oleate
CrOc: Chromium octoate
IDP: Isodecyl pelargonate
PEA: Reaction product of tris(2-methyl-1-aziridinyl) phosphine oxide with diacids (aziridine polyester)
N8C: Reaction product of N-methyldiethanolamine and sebacic acid with carboxyl end groups.

TABLE XVI

Mechanical Properties of Polyether Propellant from Hydroxyl-terminated polybutadiene, Antioxidants and Epoxide Hydroxy-terminated polybutadiene Equiv. weight: 1420; Curing time; to constant shore hardness; epoxide: similar to 3,4 epoxycyclohexylmethyl 3',4'-epoxycyclohexane carboxylate; Mechanical test temp: 22.8° C.; Solids: 88% (70% ammonium perchlorate of variable size and 18% aluminum)

| Batch No. | Epoxide Mole | Antioxidant Name | Antioxidant Moles | Catalyst Name | Catalyst % | IDP % | Surface Active Agent Name | Surface Active Agent % | Curing °C. | Curing Day | Shore Hardness | AP 400μm | AP 200μm | AP 17μm | Al | $\sigma_M$ MPa | $\sigma_r$ MPa | $\epsilon_m$ cm/cm | $\epsilon_r$ cm/cm | E MPa | Energy J |
|---|---|---|---|---|---|---|---|---|---|---|---|---|---|---|---|---|---|---|---|---|---|
| 41 | 0.94 | — | 0 | Cr Oc | 0.1 | 24.9 | — | 0 | 80 | 21 | 0.85 | 1.7 | 2.7 | 1.0 | H-15 | 0.805 | 0.805 | 0.032 | 0.032 | 30.45 | 0.17 |
| 42 | 1.00 | PBNA | 0.12 | Cr Oc | 0.1 | 24.9 | — | 0 | 80 | 19 | 0.80 | " | " | " | " | 0.996 | 0.994 | 0.087 | 0.088 | 21.18 | 0.66 |
| 43 | 1.00 | PBNA | 0.12 | Cr Ol | 2.0 | 23.0 | — | 0 | 60 | 26 | 0.72 | " | " | " | " | 0.776 | 0.779 | 0.091 | 0.091 | 12.12 | 0.56 |
| 44 | 1.00 | 2,2,4,6 | 0.16 | Cr Ol | 2.0 | 23.0 | — | 0 | 60 | 25 | 0.70 | " | " | " | " | 0.787 | 0.787 | 0.067 | 0.067 | 15.57 | 0.36 |
| 45 | 1.00 | " | 0.16 | Cr Ol | 2.0 | 23.0 | — | 0 | 60 | 21 | 0.88 | " | " | " | " | 0.935 | 0.935 | 0.077 | 0.077 | 17.94 | 0.59 |
| 46 | 1.00 | PBNA | 0.13 | Cr Oc | 0.1 | 24.9 | — | 0 | 60 | 39 | 0.70 | " | " | " | " | 0.617 | 0.617 | 0.103 | 0.013 | 9.18 | 0.41 |
| 47 | 1.00 | PBNA | 0.13 | Cr Oc | 0.1 | 24.9 | — | 0 | 60 | 43 | 0.41 | 0 | 5 | 3 | HDX-65 | 0.358 | 0.352 | 0.194 | 0.202 | 2.55 | 0.43 |
| 48 | 1.10 | PBNA | 0.13 | Cr Ol | 0.1 | 24.9 | — | 0 | 60 | 36 | 0.52 | " | " | " | " | 0.477 | 0.477 | 0.191 | 0.191 | 3.74 | 0.45 |
| 49 | 1.0 | 2,2,4,6 | 0.16 | Cr Oc | 0.2 | 24.8 | — | 0 | 60 | 26 | 0.65 | " | " | " | " | 0.981 | 0.977 | 0.106 | 0.106 | 13.29 | 0.72 |
| 50 | 1.1 | " | 0.16 | Cr Oc | 0.2 | 24.8 | — | 0 | 60 | 22 | 0.78 | " | " | " | " | 1.16 | 1.16 | 0.095 | 0.096 | 17.46 | 0.69 |
| 51 | 1.1 | " | 0.16 | Cr Ol | 2.0 | 23 | — | 0 | 60 | 27 | 0.72 | " | " | " | " | 1.13 | 1.13 | 0.107 | 0.107 | 14.47 | 0.79 |
| 52 | 1.1 | " | 0.16 | Cr Ol | 2.0 | 23 | N8C | 0.5 | 60 | 38 | 0.64 | " | " | " | " | 0.62 | 0.62 | 0.222 | 0.222 | 3.91 | 0.78 |
| 53 | 1.1 | " | 0.16 | Cr Ol | 2.0 | 20.6 | PEA | 2.4 | 60 | 60 |  | " | " | " | " | 0.43 | 0.43 | 0.143 | 0.143 | 4.41 | 0.26 |
| 54 | 1.1 | " | 0.16 | Cr Ol | 2.0 | 21.9 | N8C/PEA | 0.2/0.9 | 60 | 60 |  | " | " | " | " | 0.817 | 0.817 | 0.175 | 0.175 | 8.10 | 0.70 |

PDNA: ?
2,2,4,6: 2,2' methylene bis(4-methyl-6-tert-butyl) phenol
CrOc: Chromium octoate
CrOl: Chromium oleate
IDP: Isodecyl pelargonate
H-15: Aluminum in the powder form of 17 μm average diameter size sold by Alcan.
HDX-65: Aluminum in the powder form of 10 μm average diameter size sold by Alcan.
AP: Ammonium perchlorate

EXAMPLE XVI

Mechanical spectra of the propellants.

The mechanical spectra determined by means of an oscillatory viscoelastomer on composite propellants were employed to measure the efficiency of the surface agents used in the propellants. The dynamic mechanical properties were measured on the Rheovibron Dynamic Viscoelastomer, Model DDV II, Toyo Measuring Instrument Company, Tokyo, Japan, at temperatures varying between $-100°$ C. and $0°$ C. The samples, which measured $6 \times 0.5 \times 1$ cm were cooled at the rate of $1°$-$2°$ C/min and subjected to sinusoidal oscillations. These stresses of varying duration applied to composites enabled us to study the phenomenon of unwetting (phase separation) between the solids and the polymer. It is then possible to connect the quantity of unwetting with the peak height of tan $\delta$, which is equal to the ratio of the ion modulus E", to the storage modulus E'. These peaks are observed in the neighbourhood of the glass transition (Tg) temperature. (Ref: G. Perrault and G. Duchesne, "Evaluation of Surface-Active Additives in Highly Filled Composites by Mechanical Spectroscopy," J. Appl. Polym. Sci. 18: pp 1295–1304, 1974).

EXAMPLE XVII

Polyester propellants obtained from reaction product of hydroxyl-terminated polybutadiene and succinic anhydride and reaction product of hydroxylterminated polybutadiene and cis-1,2-cyclohexane dicarboxylic anhydride.

Figure 7:
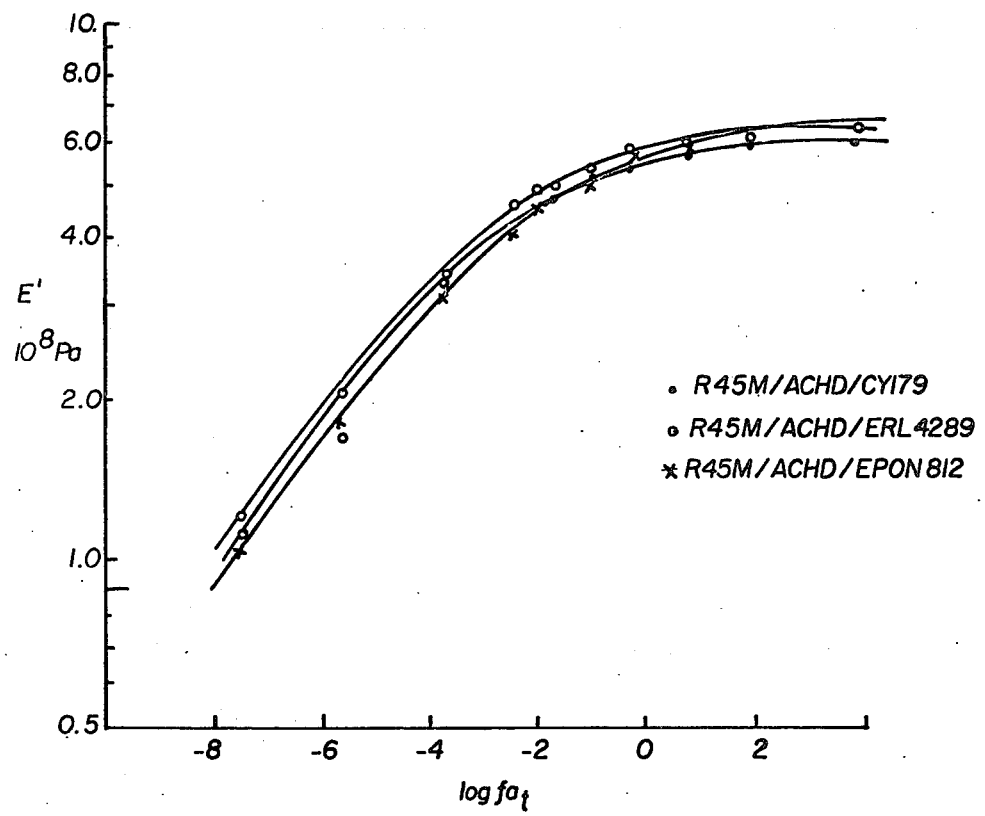
FIGS. 7–11 are reduced storage spectra of various polyester propellants.
Figure 8:
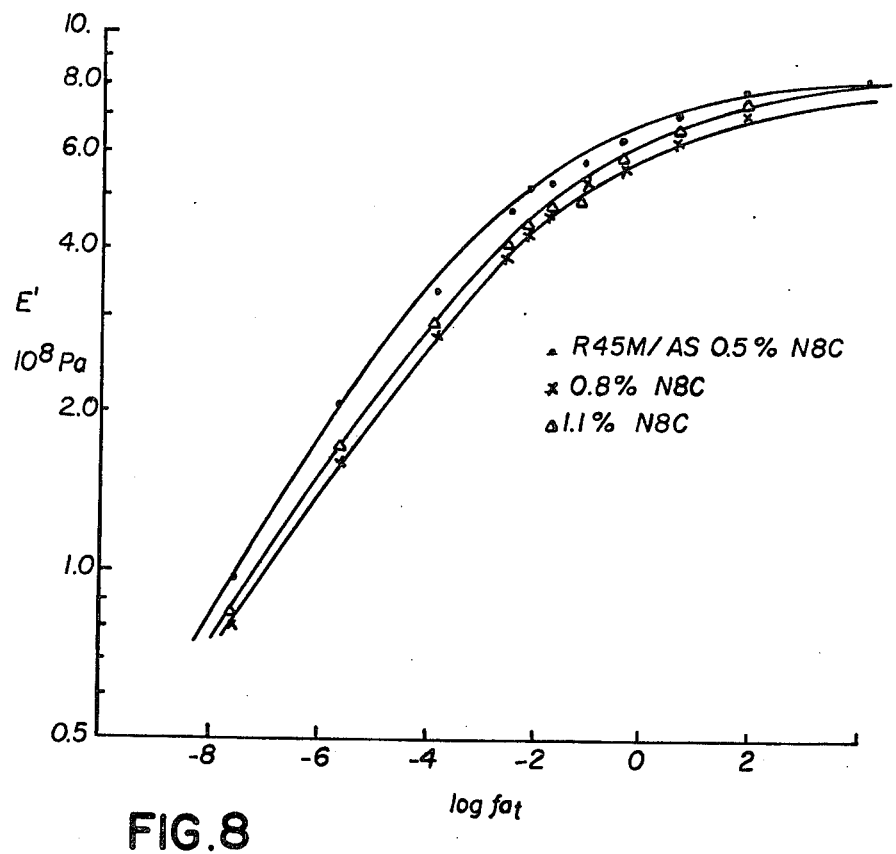
Figure 9:
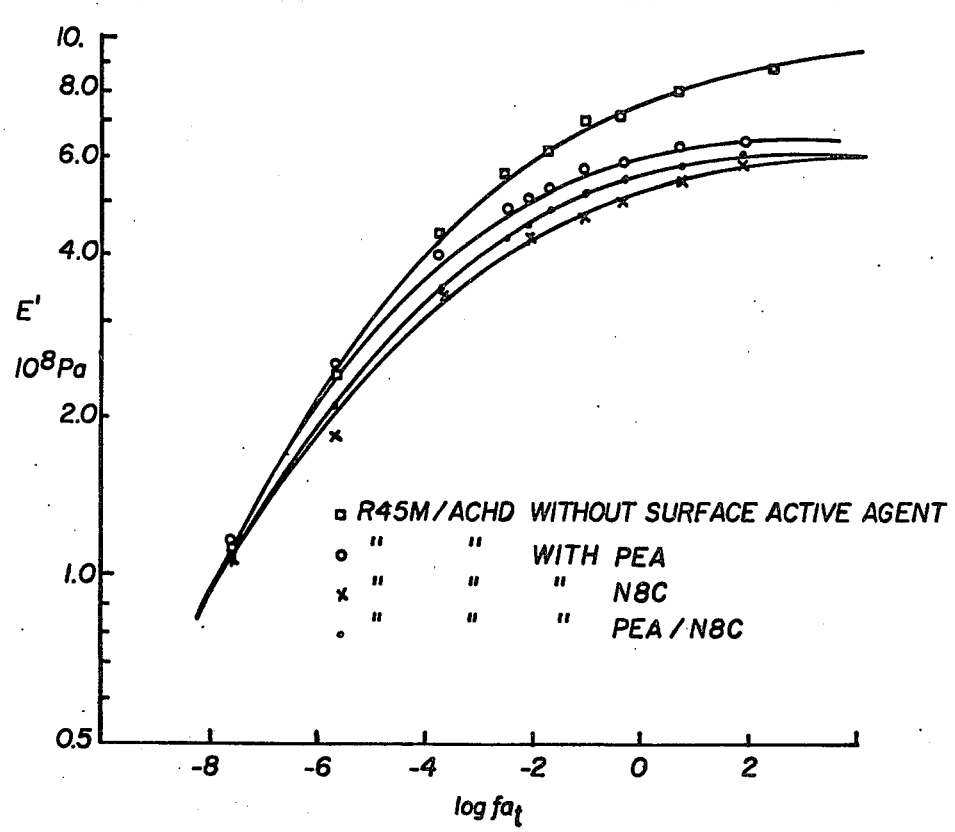
Figure 12:
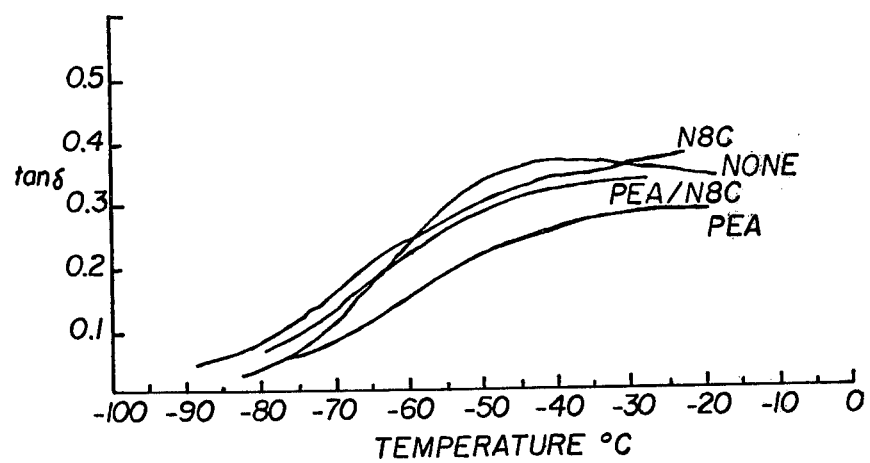
FIGS. 12 and 13 are curves of Tan δ of polyester propellants and various surface active agents.
Figure 13:
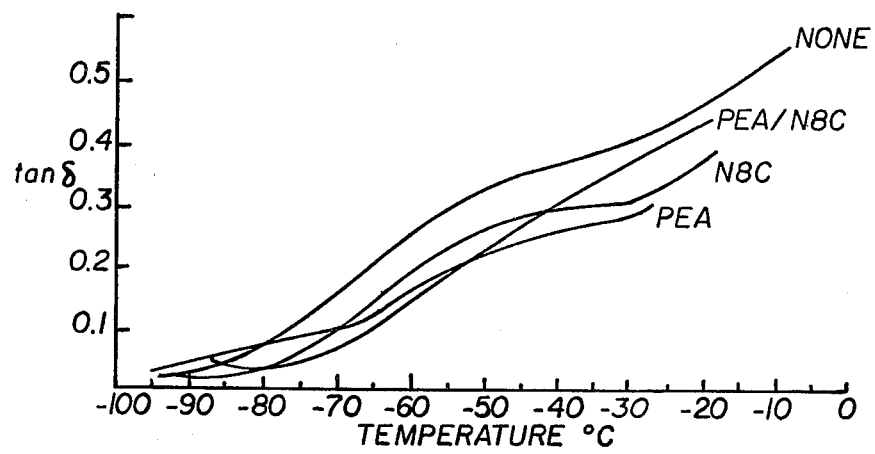

The tan$\delta$ and E" values of the polyester propellants obtained after carboxylation of hydroxyl-terminated polybutadiene with the anhydrides (succinic anhydride and cis-1,2-cyclohexanedicarboxylic anhydride) are given below in Table XVII.

thanolamine and sebacic acid with carboxyl end groups surface agent is negligible when it is employed in the reaction product of hydroxyl-terminated polybutadiene and succinic anhydride polyester propellants. Mixtures 62, 65 and 67 study the effects of the different surface active agents in the reaction product of hydroxylterminated polybutadiene and cis-1,2-cyclohexane dicarboxylic anhydride polyesters, while mixtures 65, 58 and 69 examine the effects of the various epoxides on the efficiency of the mixture of the reaction product of tris(2-methyl-1-aziridinyl) phosphine oxide with diacids (aziridine polyester)/the reaction product of N-methyldiethanolamine and sebacic acid with carboxyl end groups surface active agents in the same polyester. It is noted that the modulus of storage, E', is not greatly affected by the use of the various epoxides (see FIG. 7) or the concentration of the surface active agent (see FIG. 9). The presence of surface active agents in the propellant modifies the cross-linking and would give networks of very low comparability, even if corrections were made for the Williams-Landel-Ferry displacement factor. Nevertheless, it would appear from an examination of Table XVI above and FIG. 12 that the reaction product of tris(2-methyl-1-aziridinyl) phosphine oxide with diacids (aziridine polyester) surface active agent improves the properties of the polyester propellants, as was shown by measuring the mechanical properties (see Table XIV above).

EXAMPLE XVIII

Polyester propellants obtained from a mixture of hydroxyl-terminated polybutadiene and cis-1,2-cyclohexanedicarboxylic anhydride.

The E" and tan$\delta$ values of polyester propellants obtained by adding hydroxyl-terminated polybutadiene and cis-1,2-cyclohexanedicarboxylic anhydride ingredients separately during mixing are given in Table XVIII below.

TABLE XVII

Values of E" in Pa $\times$ $10^{-8}$ and Tan $\delta$ at the Maximum of the Mechanical Absorption Near Tg of Polyester Propellants at 110 Hz

| Batch No. | Polyester | Surface Active Agent Name | % | Tan $\delta$ Max. | Temp. °C. | E" Pa $\times$ $10^{-8}$ | Temp. °C. |
|---|---|---|---|---|---|---|---|
| 33 | R45M/SA/CY179 | N8C | 0.5 | 0.28 | −50 | 1.15 | −65 |
| 34 | " | N8C | 0.8 | 0.30 | −50 | 1.10 | −65 |
| 35 | " | N8C | 1.1 | 0.29 | −50 | 1.05 | −65 |
| 62 | R45M/CHDA/CY179 | N8C | 0.3 | 0.25 | −45 | 0.85 | −60 |
| 67 | " | PEA | 2.4 | 0.20 | −52 | 0.72 | −53 |
| 55 | " | PEA/N8C | 0.9/0.2 | 0.25 | −55 | 0.88 | −57 |
| 68 | R45M/CHDA/ERL4289 | PEA/N8C | 0.9/0.2 | 0.30 | −50 | 0.90 | −54 |
| 69 | R45M/CHDA/EPON812 | PEA/N8C | 0.9/0.2 | 0.25 | −52 | 0.85 | −60 |
| 61 | R45M/CHDA/CY179 | — | — | 0.35 | −45 | 1.40 | −62 |

R45M/SA/CY179: binder from the reaction product of hydroxyl terminated polybutadiene and succinic anhydride with epoxide similar to 3,4-epoxycyclohexyl-methyl-3',4'-epoxycyclohexane carboxylate R45M/CHDA/CH179: binder from the reaction product of hydroxyl terminated polybutadiene and cis-1,2-cyclohexanedicarboxylic anhydride with 3,4-epoxycyclohexylmethyl-3',4'-epoxycyclohexane carboxylate R45M/CHDA/ERL4289: binder from the reaction product of hydroxyl terminated polybutadiene and cis-1,2-cyclohexanedicarboxylic anhydride with bix(3,4-epoxy-6-methylcyclohexylmethyl) adipate R45M/CHDA/EPON812: binder from the reaction product of hydroxyl terminated polybutadiene and cis-1,2-cyclohexanedicarboxylic anhydride with derivative of triglycidyl glycerol N8C: reaction product of N-methyldiethanolamine and sebacic acid with carboxyl end group PEA: reaction product of tris(2-methyl-1-aziridinyl)phosphine oxide with diacids (aziridine polyester)

PEA/N8C: mixture of N-methyldiethanolamine and sebacic acid with carboxyl end group and tris(2-methyl-1-aziridinyl)phosphine oxide with diacids (aziridine polyester)

Mixtures 33, 34 and 35 show that the effect of the concentration of the reaction product of N-methyldie-

TABLE XVIII

Values of E″ in Pa × $10^{-8}$ and Tan δ at the Maximum of the Mechanical Absorption Near Tg of Polyester (Mixtures of Propellants at 110 Hz

| Batch No. | Surface Active Agent Name | % | Tan δ Maximum | Temp.°C. | E″ Pa × $10^{-8}$ | Temp.° C. |
|---|---|---|---|---|---|---|
| 146 | — | — | 0.39 | −45 | 1.13 | −60 |
| 145 | N8C | 0.5 | 0.30 | −45 | 1.40 | −62 |
| 147 | PEA | 2.4 | 0.22 | −45 | 0.88 | −58 |
| 150 | ADH-2 | 2.4 | 0.21 | −45 | 1.26 | −42 |
| 148 | ADH-3 | 2.4 | 0.35 | −35 | 0.95 | −38 |
| 100 | MAPO | 1.2 | 0.30 | −60 | 1.35 | −60 |
| 173 | PEA/N8C | 0.6/0.4 | 0.25 | −45 | 0.90 | −54 |

Figure 10:
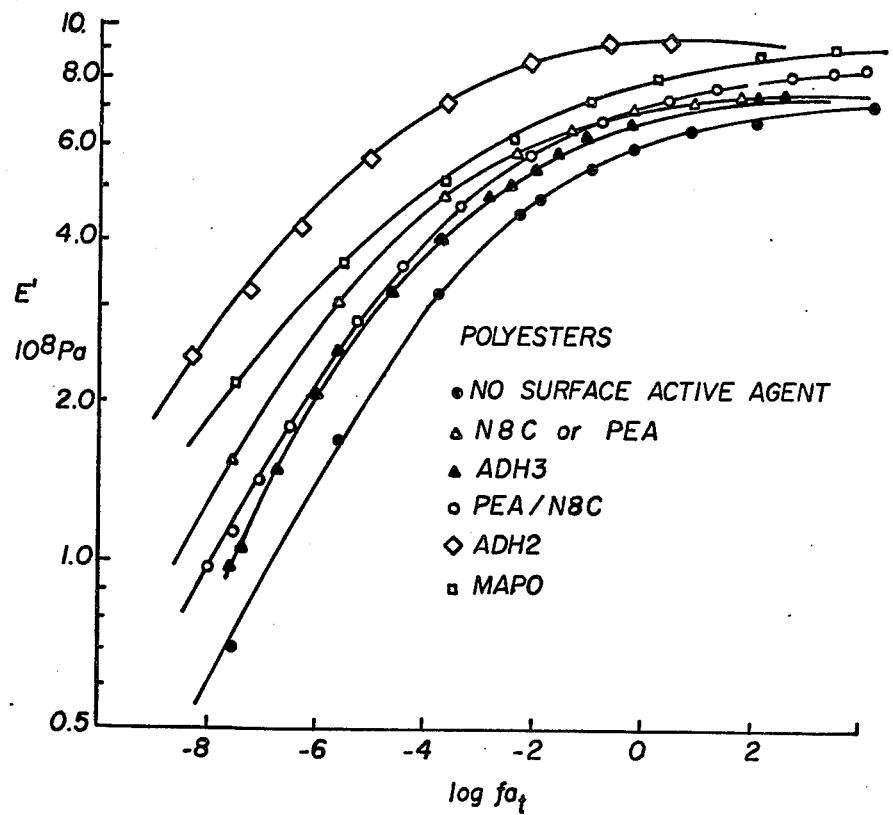
Figure 11:
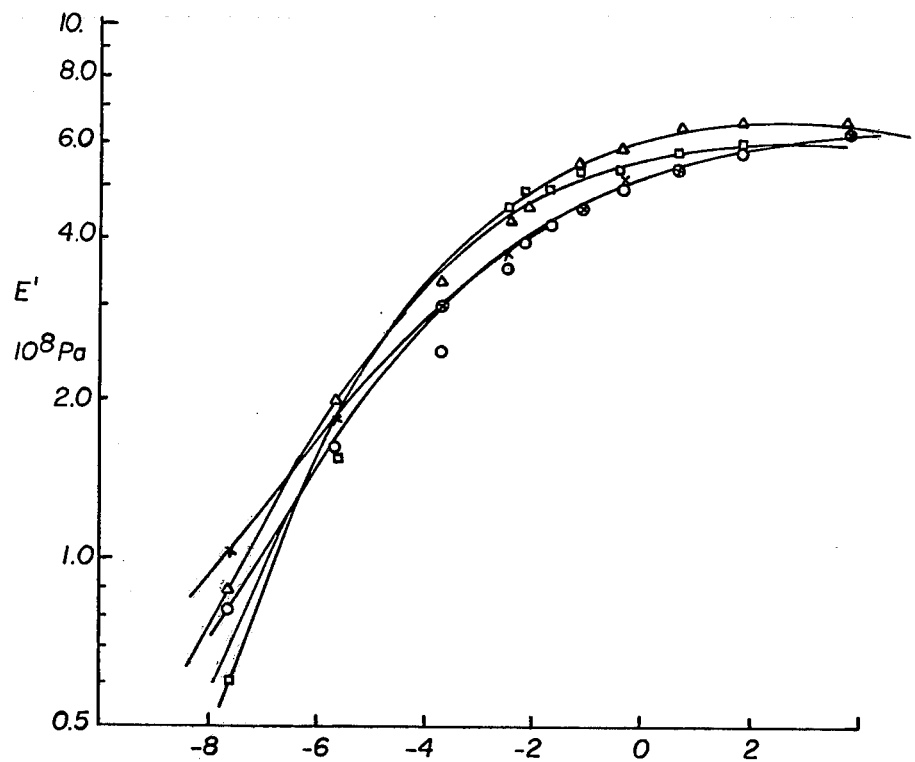
Figure 14:
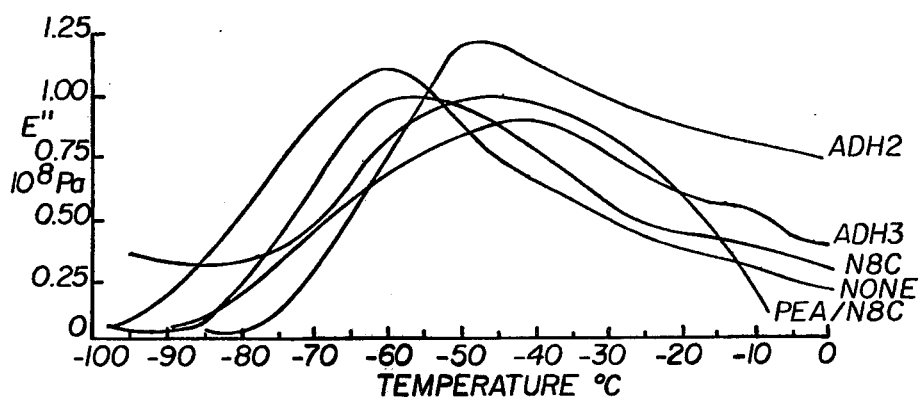
FIG. 14 is a graph of the loss modular spectrum of polyester propellants.

R45M: hydroxyl terminated polybutadiene
CHDA: cis-1,2-cyclohexanedicarboxylic anhydride
N8C: reaction product of N-methyldiethanolamine and sebacic acid with carboxylic end group
PEA: reaction product of tris(2-methyl-1-aziridinyl) phosphine oxide with diacids
ADH-2: condensation product of N-methyldiethanolamine, 2-hydroxyethylaziridine and sebacic acid
ADH-3: condensation product of dimeric diisocyanate (DD1) and 2-hydroxyethylaziridine
MAPO: tris(2-methyl-1-aziridinyl) phosphine oxide
PEA/N8C: mixture of reaction product of tris(2-methyl-1-aziridinyl) phosphine oxide with diacids and reaction product of N-methyldiethanolamine and sebacic acid with carboxylic end group The addition of various surface agents produces varied effects on the behaviour of the propellants, either during mixing by an increase in the viscosity, or on the values of E″ and tan or the curve of the storage modulus E′ (See FIG. 10). The surface agents, i.e. reaction product of tris(2-methyl-1-aziridinyl) phosphine oxide with diacids (aziridine polyester), reaction product of N-methyldiethanolamine and sebacic acid with carboxyl end groups or the mixture of reaction product of tris(2-methyl-1-aziridinyl) phosphine oxide with diacids (aziridine polyester) and reaction product of N-methyldiethanolamine and sebacic acid with carboxyl end groups mixture, increase the E′ value less than the other agents [condensation product of methyldiethanolamine, 2-hydroxyethylaziridine and sebacic acid, condensation product of dimeric diisocyanate and 2-hydroxyethylaziridine and tris(2-methyl-1-aziridinyl) phosphine oxide]. The surface agents reaction product of tris(2-methyl-1-aziridinayl) phosphine oxide with diacids (aziridine polyester) and reaction product of N-methyl-diethanolamine and sebacid acid with carboxyl end groups would appear to improve the properties according to FIGS. 11 and 14, but it is not possible to evaluate the other agents [condensation product of N-methyldiethanolamine, 2-hydroxyethylaziridine and sebacic acid, condensation product of dimeric diisocyanate and 2-hydroxyethylaziridine and tris(2-methyl-1-aziridinyl) phosphine oxide], which contribute to the polymer network and notably increase the E′ value.

EXAMPLE XIX

Polyether propellants obtained from hydroxyl-terminated polybutadiene and epoxides.

The E″ and tanδ values of polyether propellants obtained from hydroxyl-terminated polybutadiene/epoxides binders are given below in Table XIX.

TABLE XIX

Value of E″ in Pa × $10^{-8}$ and Tan δ at the Maximum of the Mechanical Absorption Near Tg of Polyether Propellants at 110 Hz

| Batch No | Surface Active Agent Name | % | Tan δ Maximum | Temp. °C. | E″ Pa × $10^{-8}$ | Temp. °C. |
|---|---|---|---|---|---|---|
| 41 | — | — | 0.42 | −35 | 0.80 | −60 |
| 42 | — | — | 0.40 | −35 | 0.90 | −50 |
| 43 | — | — | 0.58 | −35 | 0.85 | −60 |
| 44 | — | — | 0.50 | −43 | 0.85 | −60 |
| 45 | — | — | 0.50 | −35 | 0.85 | −60 |
| 52 | N8C | 0.5 | 0.40 | −35 | 0.77 | −60 |
| 53 | PEA | 2.4 | 0.50 | −40 | 1.00 | −60 |
| 54 | PEA/N8C | 0.2/0.9 | 0.40 | −40 | 1.15 | −60 |

N8C: Reaction product of N-methyldiethanolamine and sebacic acid with carboxyl end groups
PEA: Reaction product of tris(2-methyl-1-aziridinyl) phosphine oxide with diacids (aziridine polyester)

The effect of surface agents [reaction product of tris(2-methyl-1-aziridinyl) phosphine oxide with diacids (aziridine polyester), reaction product of N-methyldiethanolamine and sebacic acid with carboxyl end groups and the reaction product of tris(2-methyl-1-aziridinyl) phosphine oxide with diacids (aziridine polyester) and reaction product of N-methyl-diethanolamine and sebacic acid with carboxyl end groups mixture] on the E″ and tan δ values of polyether propellants is very slight (see Table XIX above). Moreover, these surface agents slightly increase the value of the modulus of storage, E′, and have a slight effect on cross-linking (see FIG. 11). Cooking, furthermore, is greatly slowed without improvement to the quality of the polymer-solid interface. The presence of these surface agents on the ammonium perchlorate would delay the catalysis of the perchlorate during the formation of the polyether binder.

Thus, by this invention, the transformation of an hydroxyl-terminated polybutadiene into carboxyl-terminated polybutadienes by the reaction of hydroxyl-terminated polybutadiene with solid anhydrides (e.g. succinic anhydride, methylsuccinic anhydride, etc.) under reflux in solvents, e.g. benzene or toluene, produces a prepolymer of lower viscosity (about 16 Ns/m²) than the carboxyl-terminated polybutadienes available commercially (about 25 Ns/m²).

Also by the invention, the transformation of an hydroxyl-terminated polybutadiene into a carboxyl-terminated polybutadiene by the reaction of the hydroxyl-terminated polybutadiene with a liquid anhydride, e.g. cis-1,2-cyclohexanedicarboxylic anhydride, at temperatures between about 60° and about 90° C. without a solvent, produces a prepolymer of higher viscosity than the hydroxyl-terminated polybutadiene (about 37.4 and about 6.9 Ns/m² respectively), but lower than the carboxyl-terminated polybutadiene.

Still further according to this invention, elastomers are obtained from the carboxylated derivatives of hydroxyl-terminated polybutadiene of this invention, and commercial epoxides [ERL 4221 (3,4 epoxycyclohexylmethyl 3',4'-epoxycyclohexane carboxylate), ERL 4289 bis(3,4-epoxy-6-methyl-cyclohexylmethyl) adipate, ERL 0510 (N,N-diglycidyl-p-aminophenyl glycidyl ether), EPON 812 (derivative of triglycidyl glycerol, equiv. weight: 153 g), etc.] in the presence of chromium salts (oleate, octanoate, octoate, etc.) as catalysts. The polyesters obtained have energies varying between about 1.0 and about 2.0 joules at about 22.8° C., and these are comparable to those obtained by the reaction of hydroxyl-terminated polybutadiene with the isocyanates.

Also by this invention, elastomers are obtained from a mixture of hydroxyl-terminated polybutadiene, cis-1,2-cyclohexane di-carboxylic anhydride and epoxides [CY 179 (epoxide similar to 3,4 epoxycyclohexylmethyl 3',4'-epoxycyclohexane carboxylate), ERL 4221 (3,4 epoxycyclohexylmethyl 3',4'-epoxycyclohexane carboxylate, etc.] in the presence of chromium salts (oleate, octanoate or octoate, etc.) at about 80° C. These polyesters have energies similar to the aforesaid polyesters of this invention.

This invention also provides composite propellants containing about 88% solids (aluminum and ammonium perchlorate) prepared from the polyesters of this invention. These propellants gave elongations of about 15–20% at about 22.8° C. and about 8–10% at about −45.5° C.

This invention also provides composite propellants containing about 88% solids (aluminum and ammonium perchlorate) and a polyether binder obtained by the reaction of hydroxyl-terminated polybutadiene and epoxides [ERL4221 (3,4 epoxycyclohexylmethyl 3',4'-epoxycyclohexane carboxylate), CY 179 (epoxide similar to 3,4 epoxycyclohexylmethyl 3', 4'-epoxycyclohexane carboxylate), etc.] in the presence of chromium salts (octanoate and oleate). Cooking of these polyether propellants takes place at temperatures varying between about 60° and about 125° C. in the presence of chromium oleate and ammonium perchlorate. Polyether propellants generally have mechanical properties slightly inferior to those of the polyester propellants and require long cooking times. If surface agents are added, they reduce catalysis and delay cooking.

This invention also provides, as a new surface agent, the reaction product of N-methyldiethanolamine and sebacic acid with carboxyl end groups, which is obtained from methyldiethanolamine and a slight excess of sebacic acid, H(COOCH₂CH₂—N(CH₃CH₂CH₂—COO (CH₂)₈)ₙCOOH, gives a product that possesses carboxyl-terminated groups. The addition of this surface agent to the propellants of this invention improves the mechanical properties, such as, for example, the maximum strain, $\sigma_m$, and the elongation at maximum load, $\epsilon_m$, which are determined by means of the Instron. The mechanical properties of polyester propellants are improved by between about 25 and about 50% by the addition of about 1.0% of this reaction product of N-methyl-diethanolamine and sebacic acid with carboxyl end groups surface agent, but these properties are obtained after about 56 days of aging.

We claim:

1. A process for preparing a cross-linked elastomer which comprises:
   (A) preparing a carboxyl-terminated polyolefin by reacting a hydroxyl-terminated polyolefin selected from the group consisting of polypentadiene, polyheptadiene and polyisoprene, each having hydroxyl end groups, and polyethylene, polybutylene, and polypropylene, each having hydroxyl end groups, with an acid anhydride; and
   (B) reacting the carboxyl derivative so formed with an epoxide
containing at least two epoxide groups in the presence of a metallic salt catalyst selected from the group consisting of the monocarboxylic acid salts of chromium.

2. The process of claim 1 wherein, in step (A), the reaction is carried out in a solvent selected from the group consisting of benzene, toluene, methyl and ethyl acetate, dioxane, hexane and cyclohexane.

3. The process of claim 1 wherein, in step (A), the acid anhydride is selected from the group consisting of succinic anhydride, methylsuccinic anhydride, benzene dicarboxylic anhydride, phthallic anhydride, cyclobutanedicarboxylic anhydride, 3-methylglutaric anhydride, hexahydro-4-methylphthallic anhydride, 3-methylglutaric anhydride and cis-1,2 cyclohexanedicarboxylic anhydride.

4. The process of claim 1 wherein said carboxyl-terminated polyolefin comprises carboxyl-terminated polybutadienes, which have been prepared by reacting hydroxyl-terminated polybutadienes with solid or liquid acid anhydrides.

5. The process of claim 4 wherein, in step (A), the reaction is carried out in benzene or toluene.

6. The process of claim 4 wherein, in step (A), the acid anhydride is cis-1,2-cyclohexanedicarboxylic acid.

7. The process of claim 1 wherein, in step (B), the metallic catalyst is selected from the group consisting of chromium diisopropyl salicylate, chromium naphthenate, chromium stearate, chromium acetylacetonate, chromium acetate, chromium oleate, chromium octanoate and chromium octoate.

8. The process of claim 4 wherein the metallic salt is selected from the group consisting of chromium oleate, chromium octanoate and chromium octoate.

9. The process of claim 1 wherein, in step (B), the epoxide is selected from the group consisting of: a diglycidyl ether of polyoxypropylene glycol; an epoxide derivative of triglycidyl glycerol; 3,4-epoxycyclohexymethyl-3',4'-epoxycyclohexane carboxylate; bis(3,4-epoxy-6-methylcyclohexylmethyl) adipate; N,N-diglycidyl-p-aminophenyl glycidyl ether; the epoxy derivative of sebacic acid, and the condensation product of epichlorohydrin and bisphenol-A.

10. The process of claim 4 wherein, in step (B), the epoxide is selected from the group consisting of: a diglycidyl ether of polyoxypropylene glycol; an epoxy derivative of triglycidyl glycerol; 3,4-epoxycyclohexylmethyl-3',4'-epoxycyclohexane carboxylate; bis(3,4-epoxy-6-methylcyclohexylmethyl) adipate; N,N-diglycidyl-p-aminophenyl glycidyl ether; the epoxy derivative of sebacic acid, and the condensation product of epichlorohydrin and bisphenol-A.

11. The process of claim 4 wherein, in step (B), the epoxide is a condensation product of epichlorohydrin and bisphenol-A.

12. The process of claim 4 wherein, in step (A) the anhydride is succinic anhydride or methylsuccinic anhydride.

* * * * *